US011314981B2

(12) United States Patent
Ikeda et al.

(10) Patent No.: US 11,314,981 B2
(45) Date of Patent: Apr. 26, 2022

(54) INFORMATION PROCESSING SYSTEM, INFORMATION PROCESSING METHOD, AND PROGRAM FOR DISPLAYING ASSISTANCE INFORMATION FOR ASSISTING IN CREATION OF A MARKER

(71) Applicant: SONY CORPORATION, Tokyo (JP)

(72) Inventors: Tetsuo Ikeda, Tokyo (JP); Toru Nagara, Tokyo (JP); Hiroshi Imamura, Kanagawa (JP); Takayuki Sakamoto, Kanagawa (JP); Tomohiro Ishii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 16/611,575

(22) PCT Filed: Mar. 27, 2018

(86) PCT No.: PCT/JP2018/012401
§ 371 (c)(1),
(2) Date: Nov. 7, 2019

(87) PCT Pub. No.: WO2018/211826
PCT Pub. Date: Nov. 22, 2018

(65) Prior Publication Data
US 2020/0097749 A1 Mar. 26, 2020

(30) Foreign Application Priority Data
May 17, 2017 (JP) .............................. JP2017-097820

(51) Int. Cl.
*G06K 9/20* (2006.01)
*G06F 9/451* (2018.01)
(Continued)

(52) U.S. Cl.
CPC ........... *G06K 9/2063* (2013.01); *G06F 9/453* (2018.02); *G06F 16/5854* (2019.01); *G06K 9/00671* (2013.01); *G06K 9/2081* (2013.01)

(58) Field of Classification Search
CPC ............. G06K 9/2063; G06K 9/00671; G06K 9/2081; G06F 9/453; G06F 16/5854
See application file for complete search history.

(56) References Cited

U.S. PATENT DOCUMENTS

2012/0321130 A1\* 12/2012 Osman ...................... G06K 9/00
382/103
2013/0068673 A1\* 3/2013 Maggiore .............. B01D 35/30
210/95
(Continued)

FOREIGN PATENT DOCUMENTS

JP H07-168949 A 7/1995
JP H08-339145 A 12/1996
(Continued)

OTHER PUBLICATIONS

Vuforia, "Natural Features and Rating", Qualcomm Vuforia Developer Portal, archived on Jul. 12, 2014, retrieved from https://web.archive.org/web/20140712091257/https://developer.vuforia.com/resources/dev-guide/natural-features on Jan. 15, 2021.\*
(Continued)

*Primary Examiner* — Grace Q Li
(74) *Attorney, Agent, or Firm* — Paratus Law Group, PLLC

(57) ABSTRACT

There is provided an information processing system capable of appropriately assisting in creation of a marker, an information processing method, and a program. The information processing system includes an acquisition part configured to acquire a recognition result of a marker that a user is making, and a display control part configured to cause a display face to display assistance information for assisting in creation of
(Continued)

the marker depending on the recognition result in association with the marker in process of creation.

23 Claims, 31 Drawing Sheets

(51) Int. Cl.
*G06F 16/583* (2019.01)
*G06K 9/00* (2006.01)

(56) References Cited

U.S. PATENT DOCUMENTS

| | | | | |
|---|---|---|---|---|
| 2013/0212453 | A1* | 8/2013 | Gudai | G06Q 30/02 715/202 |
| 2014/0177965 | A1* | 6/2014 | Hamada | G06K 9/46 382/192 |
| 2015/0010239 | A1* | 1/2015 | He | G06K 9/00664 382/203 |
| 2018/0341831 | A1* | 11/2018 | Szalavari | G06T 19/006 |

FOREIGN PATENT DOCUMENTS

| | | | |
|---|---|---|---|
| JP | 2002-342706 A | 11/2002 | |
| JP | 2010-198110 A | 9/2010 | |
| JP | 2012-022375 A | 2/2012 | |
| JP | 2013-149155 A | 8/2013 | |
| JP | 2013-254437 A | 12/2013 | |
| JP | 2015-090524 A | 5/2015 | |
| WO | WO 2011/058948 A1 | 5/2011 | |
| WO | WO-2015090397 A1 * | 6/2015 | .......... A47L 11/4066 |

OTHER PUBLICATIONS

Vuforia, "Similar Image Target problem?", Vuforia engine dveloper portal, posted Feb. 2012, retrieved from https://developer.vuforia.com/forum/unity-extension-technical-discussion/similar-image-targets-problem on Jan. 15, 2021.*

Vuforia, "Add an Image Target to a Database", Qualcomm Vuforia Developer Portal, archived on Jul. 12, 2014, retrieved from https://web.archive.org/web/20140712093026/https://developer.vuforia.com/resources/dev-guide/add-image-target-database on Jan. 15, 2021.*

Tsukimori et al., Puzzle-type Marker for Augmented Reality and its Application, IPSJ Symposium Series vol. 2010, No. 1, Jul. 7-9, 2010, pp. 332-337, ISSN 1882-0840, Information Processing Society of Japan.

* cited by examiner

FIG. 6
| No | IMAGE | SCORED IMAGE | POINTS |
|---|---|---|---|
| 01 | 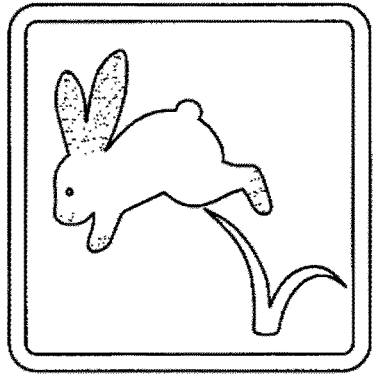 | 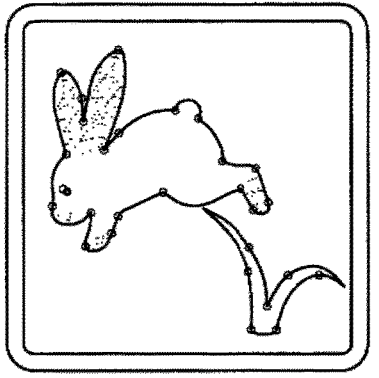 | 60 POINTS |
| 02 | 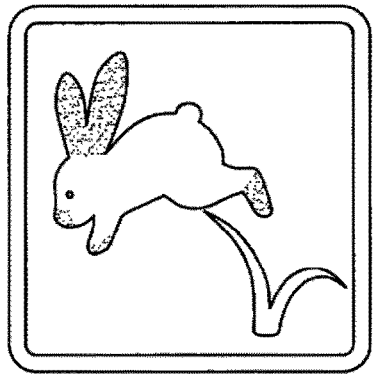 | 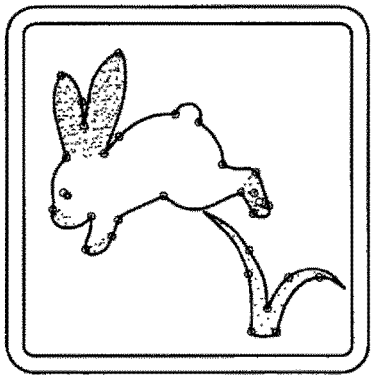 | 82 POINTS |
| 03 | 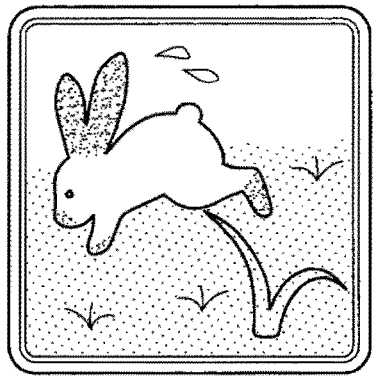 | 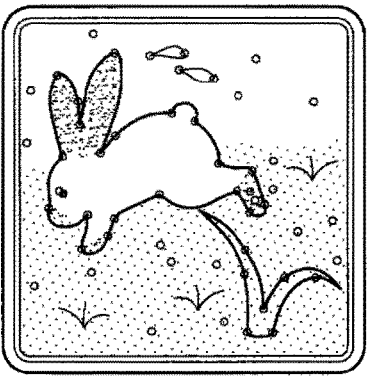 | 95 POINTS |

FIG. 7

| No | FIRING CONDITION | PROCESSING SETTING |
|---|---|---|
| 01 | SCORE IS LESS THAN 80 POINTS | • DISPLAY AREA WHERE CHARACTERISTIC AMOUNT IS DETECTED<br>• DISPLAY MESSAGE INDICATING THAT IMAGE CHARACTERISTIC AMOUNT IS LACKING |
| 02 | SCORE IS 80 POINTS OR MORE AND LESS THAN 90 POINTS | • DISPLAY AREA WHERE CHARACTERISTIC AMOUNT IS DETECTED<br>• DISPLAY AREA RECOMMENDED TO ADDITIONALLY DRAW FOR HIGHER SCORE TOGETHER WITH MESSAGE |
| 03 | SCORE IS 90 POINTS OR MORE | • DISPLAY AREA WHERE CHARACTERISTIC AMOUNT IS DETECTED<br>• DISPLAY MESSAGE INDICATING THAT IMAGE CHARACTERISTIC AMOUNT IS SUFFICIENT |

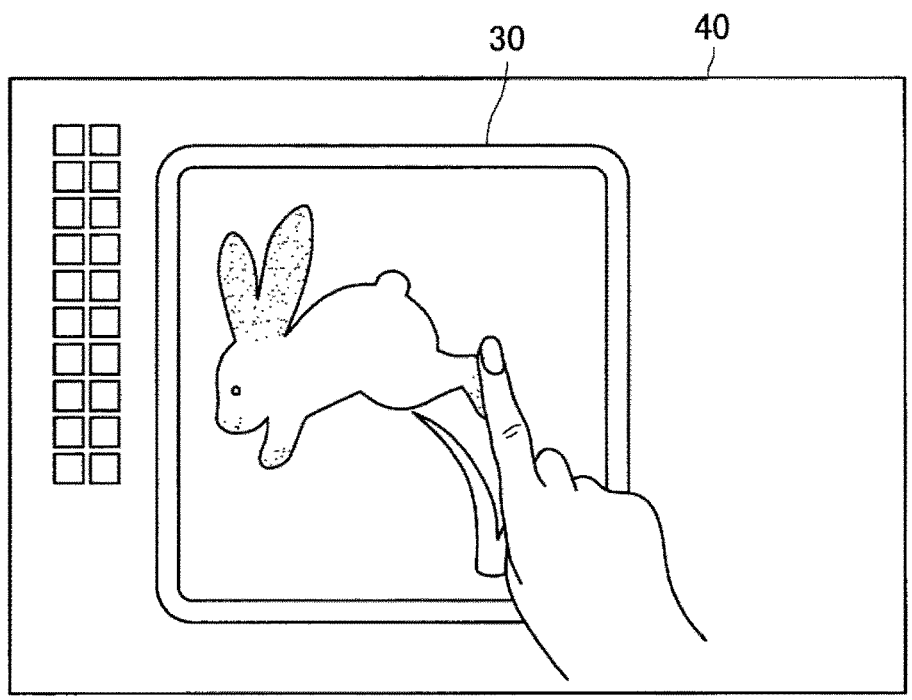

| No | FIRING CONDITION | PROCESSING SETTING |
|---|---|---|
| 01 | REGISTERED MARKER MATCHES WITH CHARACTERISTIC POINTS AT 50% OR MORE | • DISPLAY MESSAGE INDICATING THAT CHARACTERISTIC AMOUNT IS SIMILAR TO OTHER IMAGE, AND THE IMAGE |
| 02 | REGISTERED MARKER MATCHES WITH CHARACTERISTIC POINTS AT LESS THAN 20% | • DISPLAY MESSAGE INDICATING AVAILABLE |

FIG. 24A
| No | MARKER | CHARACTERISTIC POINTS |
|---|---|---|
| 01 | 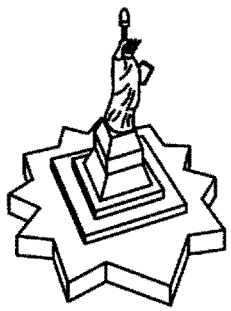 | 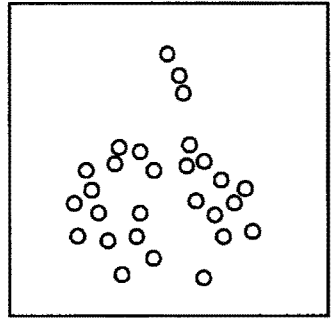 |
| 02 | 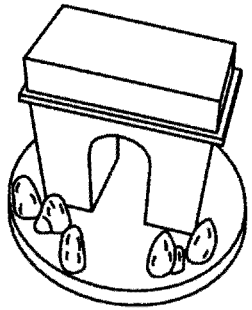 | 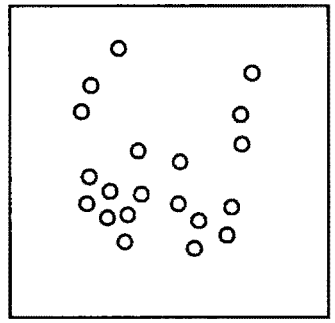 |
| 03 | 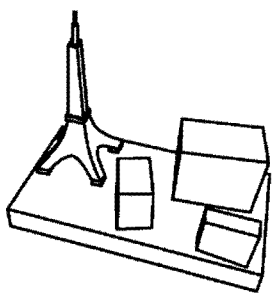 | 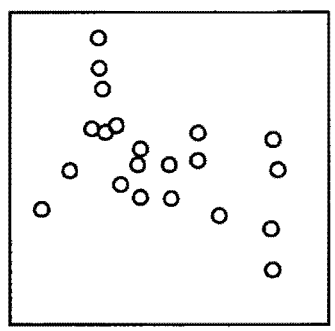 |

| No | FIRING CONDITION | PROCESSING ON ESTABLISHMENT |
|---|---|---|
| 01 | MATCH WITH REGISTERED MOCK AT 80% OR MORE | DISPLAY REGISTERED MOCK, AND PROMOTE USER TO CHANGE |
| 02 | MATCH WITH REGISTERED MOCK AT LESS THAN 80% | DO NOTHING |

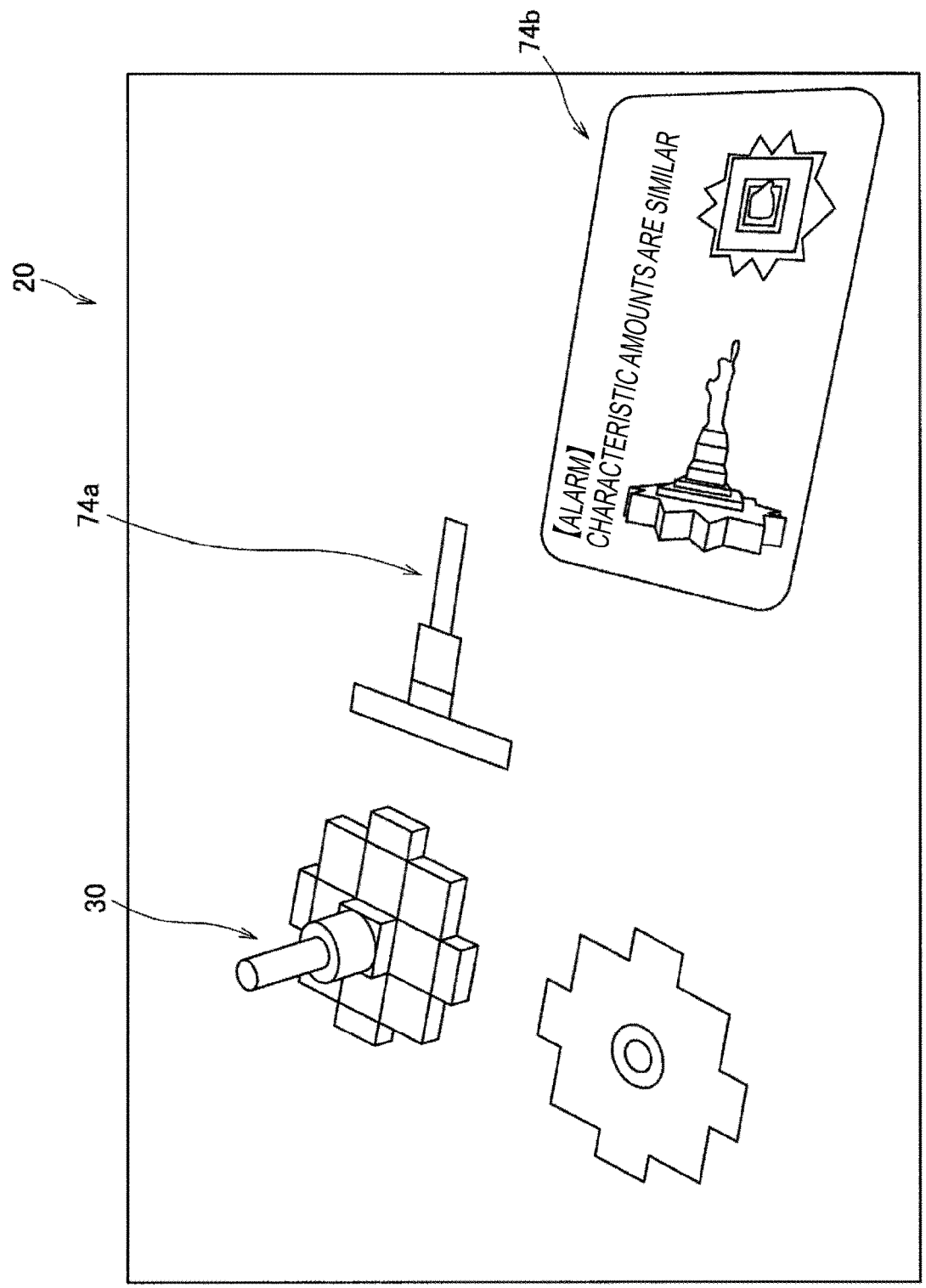

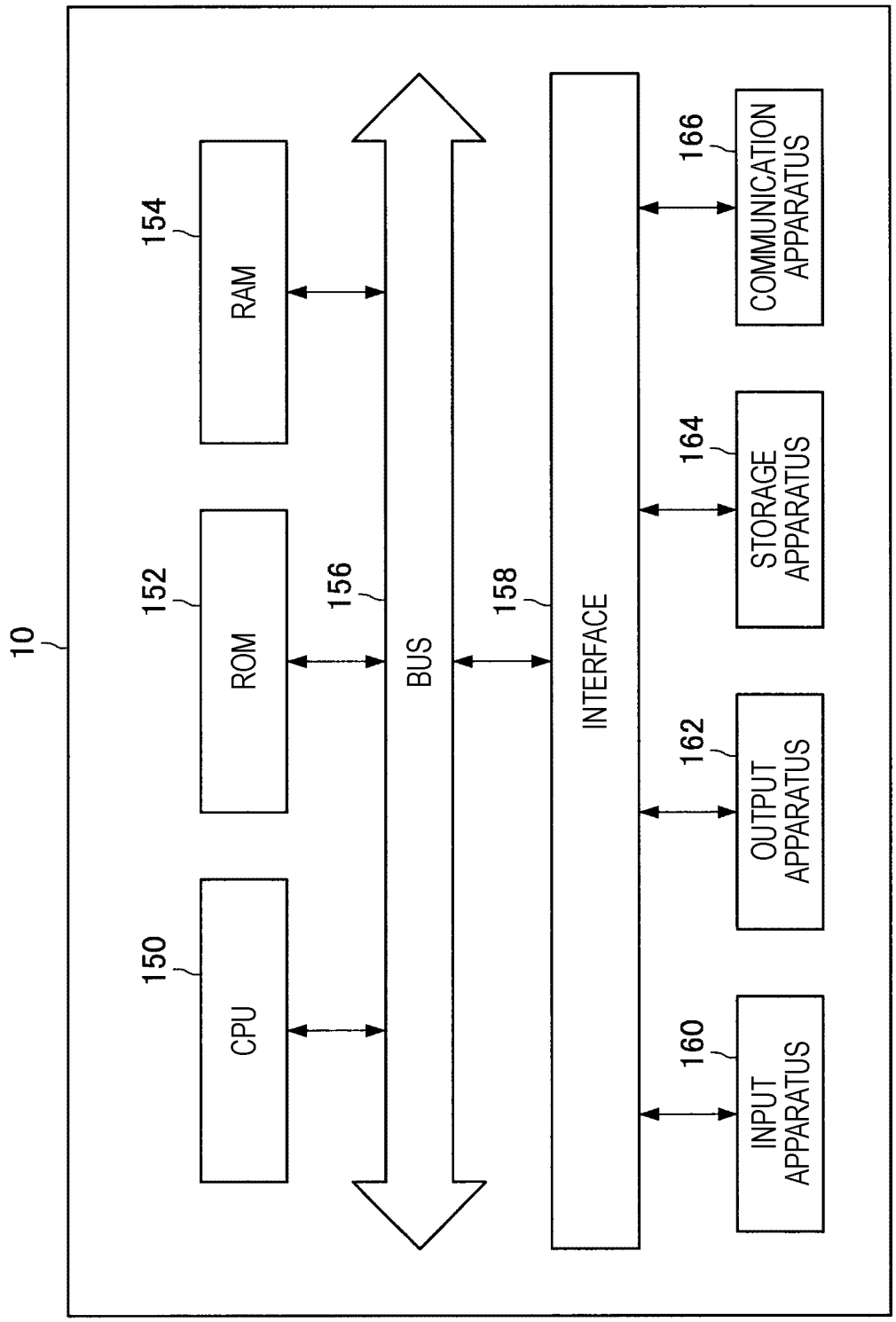

INFORMATION PROCESSING SYSTEM, INFORMATION PROCESSING METHOD, AND PROGRAM FOR DISPLAYING ASSISTANCE INFORMATION FOR ASSISTING IN CREATION OF A MARKER

CROSS REFERENCE TO PRIOR APPLICATION

This application is a National Stage Patent Application of PCT International Patent Application No. PCT/JP2018/012401 (filed on Mar. 27, 2018) under 35 U.S.C. § 371, which claims priority to Japanese Patent Application No. 2017-097820 (filed on May 17, 2017), which are all hereby incorporated by reference in their entirety.

TECHNICAL FIELD

The present disclosure relates to an information processing system, an information processing method, and a program.

BACKGROUND ART

Various augmented reality (AR) technologies have been conventionally developed. AR enables additional information associated with an object in an environment where a user is present to be presented to the user.

For example, Patent Document 1 describes a technology for analyzing a captured image thereby to detect a marker, and calling a function associated with the detected marker.

CITATION LIST

Patent Document

Patent Document 1: Japanese Patent Application Laid-Open No. 2015-90524

SUMMARY OF THE INVENTION

Problems to be Solved by the Invention

However, the technology described in Patent Document 1 does not consider assisting in creation of a marker when a user creates the marker.

Thus, the present disclosure proposes a novel and improved information processing system capable of appropriately assisting in creation of a marker, an information processing method, and a program.

Solutions to Problems

According to the present disclosure, there is provided an information processing system including an acquisition part configured to acquire a recognition result of a marker that a user is making, and a display control part configured to cause a display face to display assistance information for assisting in creation of the marker depending on the recognition result in association with the marker in process of creation.

Further, according to the present disclosure, there is provided an information processing method including acquiring a recognition result of a marker that a user is making, and causing, by a processor, a display face to display assistance information for assisting in creation of the marker depending on the recognition result in association with the marker in process of creation.

Further, according to the present disclosure, there is provided a program for causing a computer to function as an acquisition part configured to acquire a recognition result of a marker that a user is making, and a display control part configured to cause a display face to display assistance information for assisting in creation of the marker depending on the recognition result in association with the marker in process of creation.

Effects of the Invention

As described above, according to the present disclosure, it is possible to appropriately assist in creation of a marker. Additionally, the effect described herein is not restrictive, and may be any effect described in the present disclosure.

BRIEF DESCRIPTION OF DRAWINGS

FIG. 6 is a diagram illustrating that a score calculation part 104 according to the first embodiment calculates a score of a marker in process of creation by way of example.

FIG. 7 is a diagram illustrating an exemplary configuration of an assistance information DB 128 according to the first embodiment.

FIG. 8A is a diagram illustrating how a user creates a marker.

FIG. 24A is a diagram illustrating an exemplary configuration of the marker information DB 130 according to the sixth embodiment.

FIG. 25B is a diagram illustrating exemplary display of alarm information in a case where other 3D marker matches with a group of characteristic points at a predetermined threshold or more.

FIG. 26 is an explanatory diagram illustrating an exemplary hardware configuration of the information processing system 10 common in the respective embodiments.

MODE FOR CARRYING OUT THE INVENTION

Figure 1:
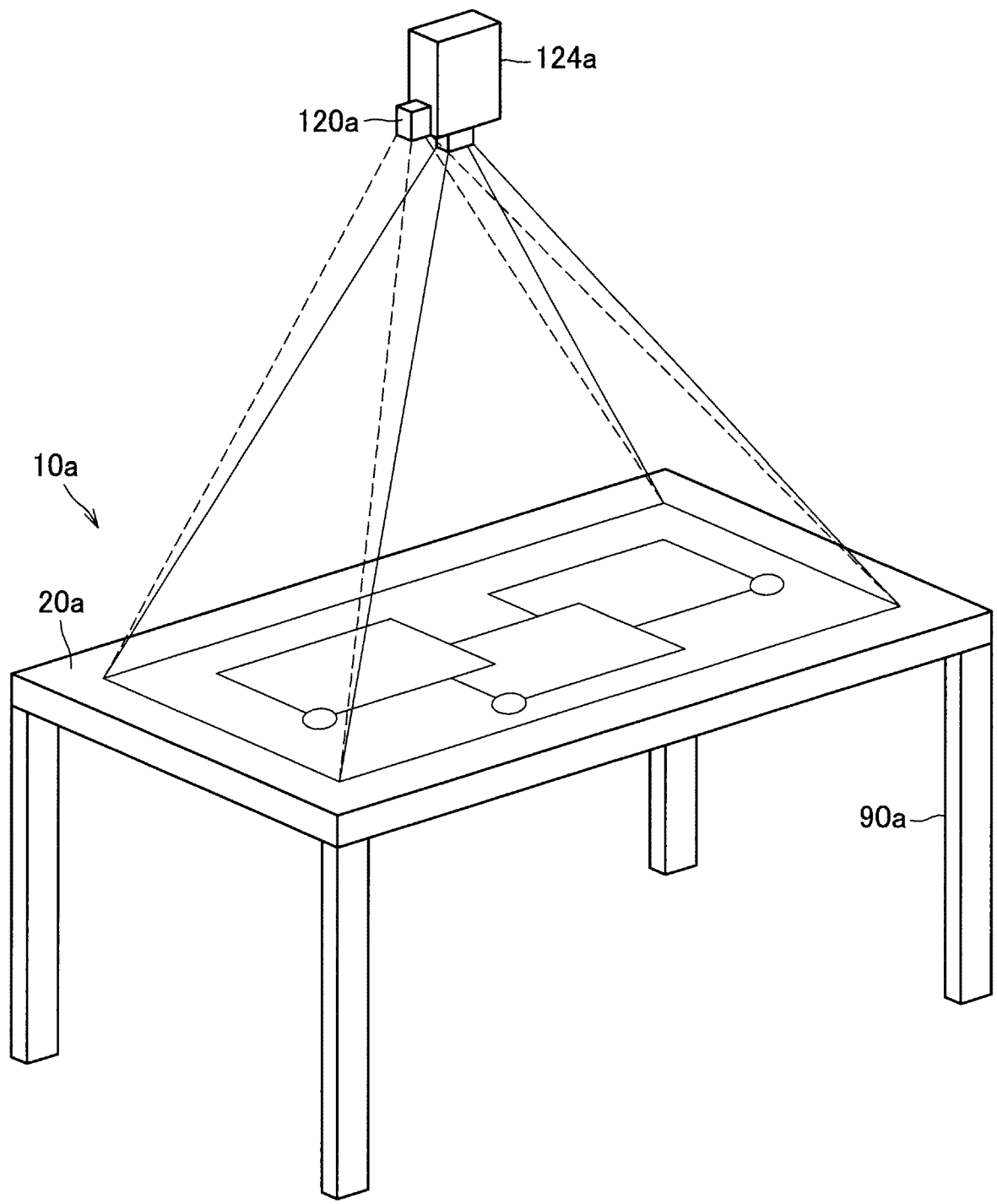
FIG. 1 is an explanatory diagram illustrating an exemplary configuration of an information processing system 10 common in the respective embodiments of the present disclosure.

Preferred embodiments of the present disclosure will be described below in detail with reference to the accompanying drawings. Additionally, the components having substantially the same functional configuration are denoted with the same reference numeral and a repeated description thereof will be omitted in the present specification and the drawings.

Further, a plurality of components having substantially the same functional configuration may be discriminated by different alphabets after the same reference numeral in the present specification and the drawings. For example, a plurality of components having substantially the same functional configuration such as marker 30a and marker 30b is discriminated as needed. However, in a case where each of a plurality of components having substantially the same functional configuration does not need to be particularly discriminated, they are denoted with only the same reference numeral. For example, in a case where the marker 30a and the marker 30b do not need to be particularly discriminated, they are simply denoted as marker 30.

Further, "MODE FOR CARRYING OUT THE INVENTION" will be described in the following item order.

1. Configuration of information processing system
2. First Embodiment
3. Second Embodiment
4. Third Embodiment
5. Fourth Embodiment 6. Fifth Embodiment
7. Sixth Embodiment
8. Seventh Embodiment
9. Hardware configuration
10. Variants

1. Configuration of Information Processing System

An exemplary configuration of an information processing system 10 common in the respective embodiments of the present disclosure will be first described. FIG. 1 is an explanatory diagram illustrating an exemplary configuration of the information processing system 10. Additionally, a system can mean a configuration for performing predetermined processing in the present specification. A system may be configured of one apparatus or may be configured of a plurality of apparatuses. Further, the information processing system 10 according to the present embodiments may be also configured to be able to perform predetermined processing as the entire information processing system 10, and any component in the information processing system 10 may be regarded as one apparatus.

With reference to FIG. 1, an information processing system 10a common in the respective embodiments of the present disclosure includes an input part 120a and a display part 124a.

1-1. Display Part 124

The display part 124a displays various items of information on a table 90a. The display part 124a can be a projection part (projector). For example, the display part 124a can be arranged above the table 90a apart from the table 90a by a predetermined distance or more to be suspended from the ceiling as illustrated in FIG. 1. In this case, the display part 124a projects information on the top of the table 90a. For example, the display part 124a may be a pendant light or a desk light. A system for displaying information on the top of the table 90a from above in this way is also called "projection type". Further, the top of the table 90 may be denoted as screen 20 below. The screen 20 includes a face (display face) to be projected by the display part 124.

For example, the display part 124a displays a virtual display object under control of a display processing part 122 described below. The display object is a window, a UI object, or the like, for example. The UI object is a predetermined image (still image or moving image) for receiving various user operations (such as selecting or inputting). For example, the UI object is an image including a graphical user interface (GUI) part (such as button, slider, checkbox, textbox, or software keyboard). Further, the UI object can be arranged within the window.

1-2. Input Part 120

The input part 120a includes a camera for capturing the table 90a by one lens, for example. Alternatively, the input part 120a can include a stereo camera capable of recording depth information by capturing the table 90a by two lenses. The stereo camera can employ a visible-ray camera, an invisible-ray camera capable of detecting an invisible ray such as infrared ray, or the like, for example. Further, the input part 120a may further include a voice input apparatus such as microphone for collecting user's voice or environment sounds of a surrounding environment.

In a case where the input part 120a employs a camera for capturing the table 90a by one lens, the information processing system 10a analyzes an image captured by the camera (shot image) thereby to detect the position of an object (such as user's hand) positioned on the screen 20. Further, in a case where the input part 120a employs a stereo camera, the information processing system 10a analyzes an image captured by the stereo camera thereby to acquire depth information of an object in addition to the position information of the object positioned on the screen 20. The information processing system 10a can detect contact or approach of user's hand onto the screen 20 or release thereof from the screen 20 on the basis of the depth information. Additionally, the input part 120a may have a depth sensor (such as sensor in time of flight system or sensor in structured light system) instead of the stereo camera. In this case, the depth sensor can obtain the depth information of an object positioned on the screen 20.

In each embodiment, the position of an operator (such as user's hand, or various operation members such as stylus pen) on the screen 20 is detected on the basis of an image captured by the input part 120a, and various items of information can be input on the basis of the detected position of the operator. That is, the user can input various operations by moving the operator on the screen 20. For example, when contact of user's hand on the window or UI object is detected, the operation on the window or the UI object is input.

Further, a camera included in the input part 120a may capture not only the top of the table 90a but also the user present around the table 90a. In this case, the information processing system 10a can detect the user position around the table 90a on the basis of the image captured by the input part 120a. Further, the information processing system 10a extracts physical characteristics (such as size of the face or body) capable of specifying an individual user on the basis of the captured image, thereby making user's personal recognition.

Not limited to the above example, a user operation may be input in other method. For example, the input part 120a may be installed as a touch panel on the top (screen 20a) of the table 90a, and user operation input may be detected by contact of user's finger or the like on the touch panel. Further, user operation input may be detected by a gesture for a camera included in the input part 120a.

1-3. Variants

The configuration of the information processing system 10a common in the respective embodiments has been described above. Additionally, the configuration of the information processing system common in the respective embodiments is not limited to the example illustrated in FIG. 1, and may be ones illustrated in FIG. 2 to FIG. 4, for example.

{1-3-1. Variant 1}

Figure 2:
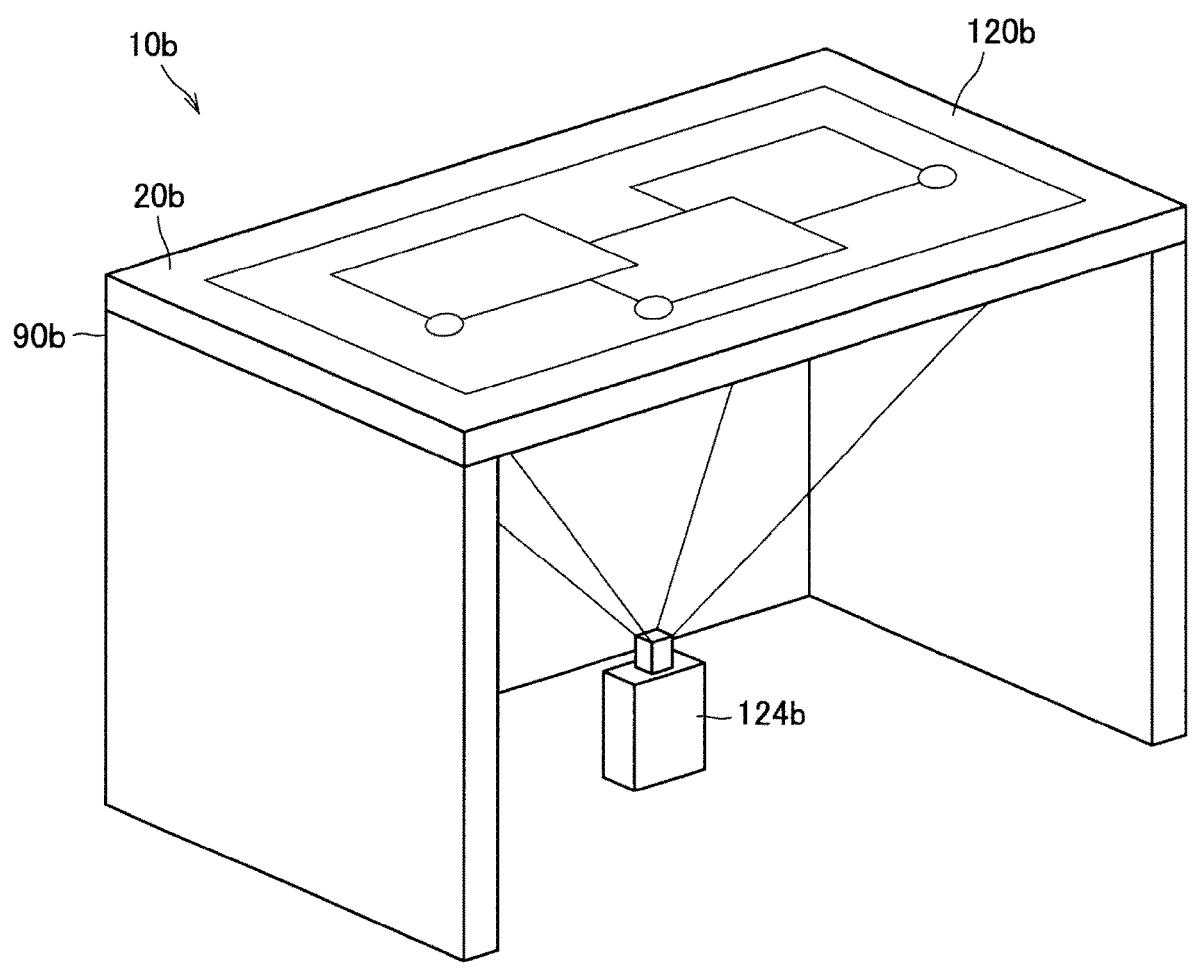
FIG. 2 is an explanatory diagram illustrating another exemplary configuration of the information processing system 10 common in the respective embodiments.

FIG. 2 is a diagram illustrating another exemplary configuration (information processing system 10b) of the information processing system common in the respective embodiments. A display part 124b is arranged below a table 90b in the information processing system 10b as illustrated in FIG. 2. The display part 124b is a projector, for example, and projects information toward the top of the table 90b from below. For example, the top of the table 90b includes a transparent material such as glass plate or transparent plastic plate. The information projected by the display part 124b is then displayed on the top (screen 20b) of the table 90b (through the top). A system for projecting information from below the table 90*b* by the display part 124*b* thereby to display the information on the screen 20*b* is also called "rear projection type".

Further, in the example illustrated in FIG. 2, the screen 20*b* (top face) is provided with the input part 120*b*. The input part 120*b* is configured of a touch panel, for example. In this case, contact of an operator on the screen 20*b* is detected by the touch panel, and the user's operation is input. Not limited to the example, however, the input part 120*b* may be installed below the table 90*b* apart from the table 90*b* similarly as in the information processing system 10*a* illustrated in FIG. 1. In this case, the input part 120*b* includes a camera, and the camera can capture the operator positioned on the screen 20*b* through the top of the table 90*b*. Then, the position of the operator can be detected on the basis of the captured image.

{1-3-2. Variant 2}

Figure 3:
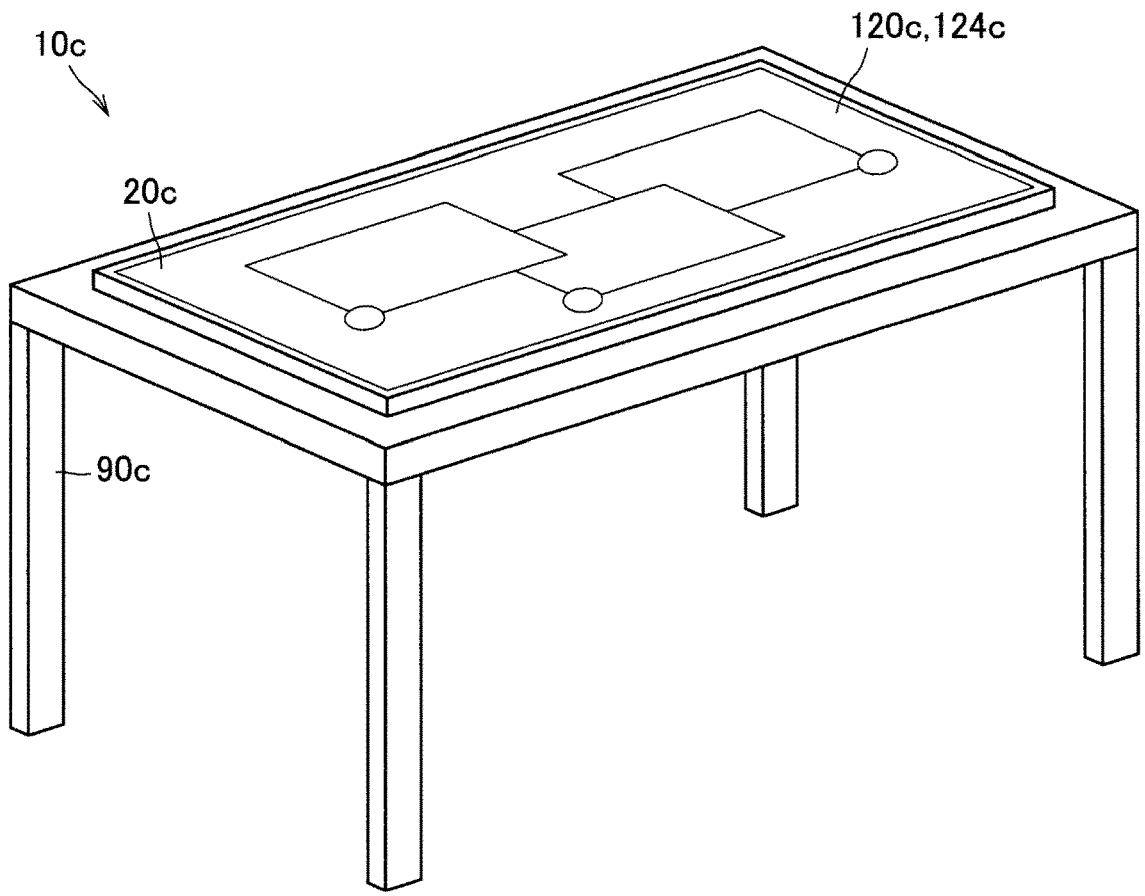
FIG. 3 is an explanatory diagram illustrating another exemplary configuration of the information processing system 10 common in the respective embodiments.

FIG. 3 is a diagram illustrating another exemplary configuration (information processing system 10*c*) of the information processing system common in the respective embodiments. As illustrated in FIG. 3, a touch panel display is installed with the display face upward on a table 90*c* in the information processing system 10*c*. An input part 120*c* and a display part 124*c* can be integrally configured as the touch panel display in the information processing system 10*c*. That is, various items of information are displayed on the display screen (screen 20*c*) of the display and contact of an operator on the display screen of the display is detected by the touch panel thereby to input the user's operation. Additionally, a camera (exemplary input part 120*c*) may be installed above the display part 124*c* also in the information processing system 10*c* similarly as in the information processing system 10*a* illustrated in FIG. 1. In this case, the position and the like of an individual user positioned around the table 90*c* can be detected on the basis of an image captured by the camera.

{1-3-3. Variant 3}

Figure 4:
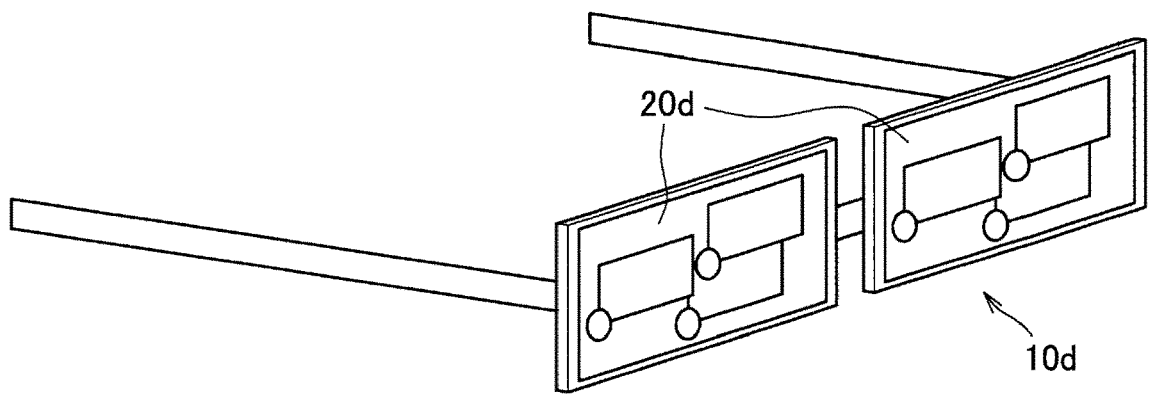
FIG. 4 is an explanatory diagram illustrating another exemplary configuration of the information processing system 10 common in the respective embodiments.

FIG. 4 is a diagram illustrating another exemplary configuration (information processing system 10*d*) of the information processing system common in the respective embodiments. As illustrated in FIG. 4, the information processing system 10*d* can be configured as a head-mounted device (such as glasses-type device) such as head mounted display (HMD). The head-mounted device can include an input part 120*d* (not illustrated) and a display part 124*d* (not illustrated). The display part 124*d* may be configured as a transmissive display apparatus. In this case, the display part 124*d* projects a video by use of the region of at least part of each of the right-eye lens and the left-eye lens (or goggles-type lenses) included in the head-mounted device as a projection face (screen 20*d*).

Alternatively, the display part 124*d* may be configured as a non-transmissive display apparatus. For example, the display part 124*d* can include a liquid crystal display (LCD), an organic light emitting diode (OLED), or the like. In this case, the input part 120*d* includes a camera, and a video in front of the user captured by the camera may be sequentially displayed on the display part 124*d*. Thereby, the user can view the scene ahead of the user via the video displayed on the display part 124*d*.

The configuration of the information processing system common in the respective embodiments has been described above. As described below, the information processing system 10 according to each embodiment can acquire a recognition result of a user-creating marker, and can cause the display face to display assistance information for assisting in creation of the marker depending on the recognition result in association with the marker in process of creation. Thus, it is possible to appropriately assist in creation of the marker.

Here, a marker can be a unit (such as geometric pattern, or combination of geometric pattern and hue) individually recognizable by the information processing system 10 (more specifically a processing part 100 described below). A marker may be a physical marker created on a physical object such as sheet or plate. Alternatively, a marker may be a virtual marker created by use of a tablet or the like and a digital pen or the like and including image data or the like to be displayed on the screen of the tablet or the like.

For example, a marker is a group (collation) of characteristic amounts recognizable by the information processing system 10 (the processing part 100). Exemplary kinds of markers include a visible-ray marker, an invisible-ray marker for infrared ray or the like, and the like. The contents of each embodiment will be sequentially described below in detail.

2. First Embodiment

A first embodiment of the present disclosure will be first described. As described below, according to the first embodiment, it is possible to assist the user to efficiently create a more reliable marker.

2-1. Functional Configuration

Figure 5:
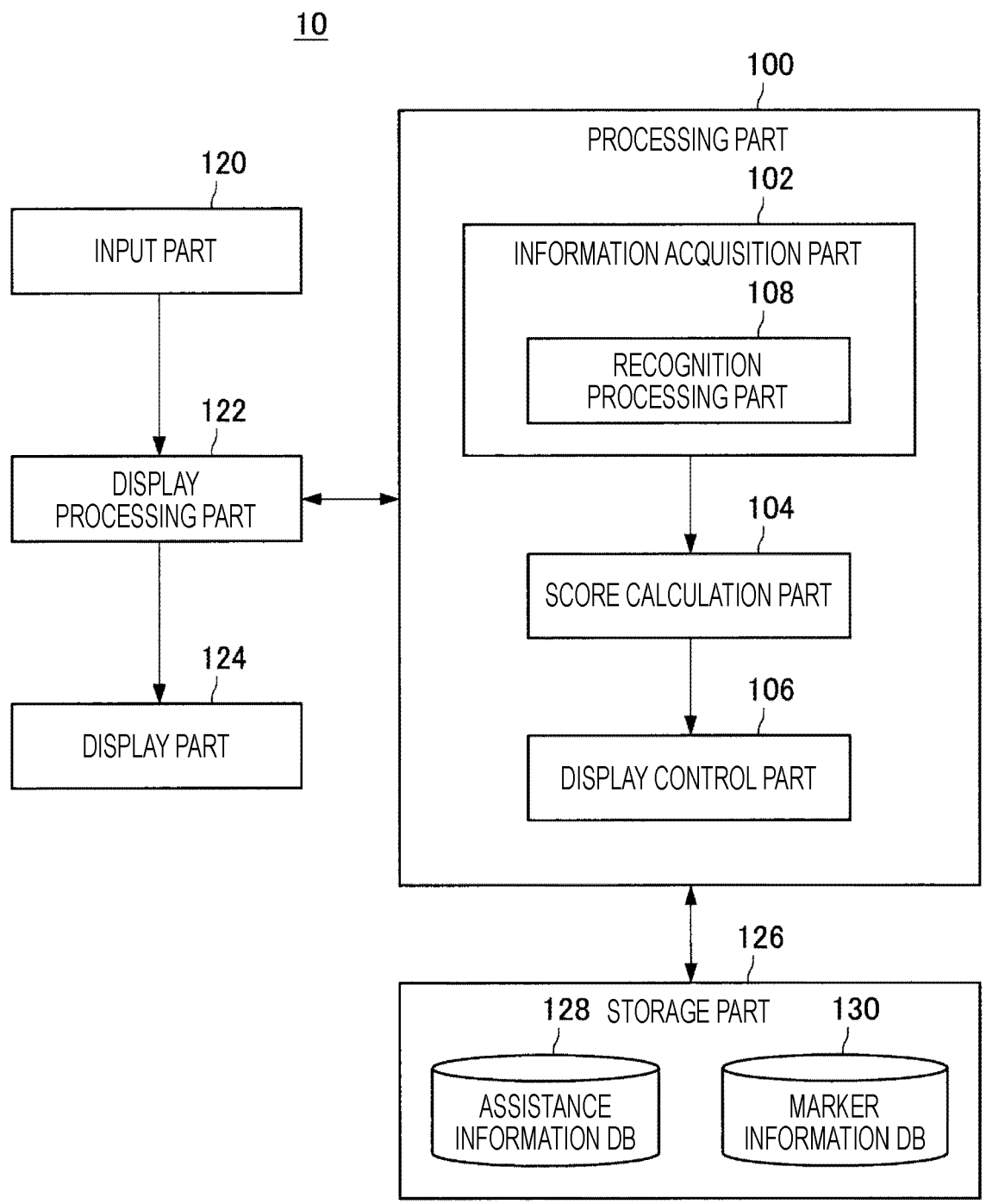
FIG. 5 is a functional block diagram illustrating an exemplary functional configuration of the information processing system 10 according to a first embodiment of the present disclosure.

A functional configuration of the first embodiment will be first described in detail. FIG. 5 is a block diagram illustrating a functional configuration of the information processing system 10 according to the first embodiment. As illustrated in FIG. 5, the information processing system 10 includes the processing part 100, the input part 120, the display processing part 122, the display part 124, and a storage part 126. Additionally, the similar contents to the above description will be omitted below.

{2-1-1. Display Processing Part 122}

The display processing part 122 can include one or more processing circuits (such as central processing unit (CPU) or graphics processing unit (GPU)). The display processing part 122 performs a processing for graphics displayed on the display part 124 on the basis of input information acquired by the input part 120. For example, the display processing part 122 performs drawing control on a display objet such as window, a drawing processing in response to a user's operation on an individual display object, or the like.

Further, the display processing part 122 can output the input information (such as captured image) acquired by the input part 120 to the processing part 100 described below. Further, the display processing part 122 can receive the information processed by the processing part 100 from the processing part 100 and then perform the graphics processing based on the information.

{2-1-2. Processing Part 100}

The processing part 100 can include one or more processing circuits (such as central processing unit (CPU) 150 described below). The processing part 100 performs various processing on the basis of the input information acquired by the input part 120.

Further, the processing part 100 performs control for the processing modes. For example, in a case where a processing mode switching condition (a predetermined operation is performed, for example) is established, the processing part 100 updates the processing mode corresponding to the condition in a plurality of preset kinds of processing as a current processing mode. Specific examples of operations for switching the processing modes include a user selection operation on a mode selection screen displayed by the display part 124, an operation on a predetermined operation button included in the input part 120, a predetermined touch operation, a predetermined voice command, or the like.

Here, a plurality of kinds of processing modes includes a first mode (denoted as creation mode below), a second mode (denoted as association mode below), and a third mode (denoted as execution mode below), for example. The creation mode can be a mode of creating a marker. As described below, in the creation mode, for example, a display control part 106 described below can display assistance information in association with a user-creating marker. Additionally, the created marker can be stored in a marker information DB 130 described below.

The association mode can be a mode of associating a created marker with a predetermined function or information. For example, in the association mode, the display control part 106 can first cause the display part 124 to display a selection screen for associating at least one of a plurality of prepared functions or items of information (such as images or character strings) with a created marker. Then, the user selected function or information can be associated with the created marker on the basis of a user's operation on the selection screen. The information indicating the association result can be then stored in the storage part 126.

The execution mode can be a mode of recognizing a created marker, for example, and performing a processing depending on the recognition result. For example, in the execution mode, the processing part 100 (recognition processing part 108 described below) can first recognize an image captured by the input part 120. The processing part 100 then compares the recognition result with the contents in the marker information DB 130 thereby to determine whether or not a marker corresponding to the recognition result is registered. Then, in a case where the marker corresponding to the recognition result is registered, the processing part 100 can perform the function associated with the marker or cause the display part 124 to display the information associated with the marker.

Further, the processing part 100 has an information acquisition part 102, the recognition processing part 108, a score calculation part 104, and the display control part 106 as illustrated in FIG. 5.

{2-1-3. Recognition Processing Part 108}
(2-1-3-1. Recognition Processing)

The recognition processing part 108 performs the recognition processing such as image recognition on various items of information acquired by the display processing part 122. For example, the recognition processing part 108 makes predetermined image recognition of a captured image (RGB image) of a user-creating marker (simply denoted as "marker in process of creation" below) acquired from the display processing part 122, and then recognizes the image characteristic amount of the marker in process of creation. By way of example, the recognition processing part 108 recognizes an individual characteristic point from a captured image of the marker in process of creation, and specifies the position of the recognized characteristic point.

Further, whenever a design of the marker in process of creation is changed (edited, for example) by the user and a captured image of the changed marker is acquired from the display processing part 122, the recognition processing part 108 can sequentially recognize the changed marker depending on the captured image of the changed marker.

(2-1-3-2. Output of Recognition Result)

Further, the recognition processing part 108 outputs the recognition result to the information acquisition part 102. Here, the recognition result can include the recognition result of the characteristic amount of the marker in process of creation (such as the number of characteristic points recognized from the marker in process of creation, and position information of individual characteristic points)

{2-1-4. Information Acquisition Part 102}

The information acquisition part 102 is an exemplary acquisition part according to the present disclosure. The information acquisition part 102 acquires various items of information from the display processing part 122. For example, the information acquisition part 102 receives or reads a physical space sensing result sensed by the input part 120 (such as image of an object captured by the input part 120), and acquires it from the display processing part 122.

Further, the information acquisition part 102 receives or reads the recognition result by the recognition processing part 108, and acquires it from the recognition processing part 108. For example, the information acquisition part 102 acquires the recognition result of the marker in process of creation from the recognition processing part 108.

{2-1-5. Score Calculation Part 104}
(2-1-5-1. Exemplary Calculation 1)

The score calculation part 104 is an exemplary calculation part according to the present disclosure. The score calculation part 104 calculates a score (evaluation value) of a marker in process of creation depending on the recognition result of the marker in process of creation by the recognition processing part 108. For example, the score calculation part 104 calculates a value indicating a degree of recognition accuracy or a degree of posture stability of the marker depending on the recognition result of the marker in process of creation as the score.

More specifically, the score calculation part 104 calculates a score of the marker in process of creation on the basis of the number of characteristic points, a distribution of characteristic points, and the like recognized from the marker in process of creation. For example, the score calculation part 104 calculates a score such that as the number of characteristic points recognized from the marker in process of creation is larger, the score of the marker in process of creation is higher. Further, the score calculation part 104 calculates a score such that as a distribution of characteristic points recognized from the marker in process of creation is more uniform, the score of the marker in process of creation is higher. However, not limited to the example, other calculation method may be employed. According to the exemplary calculations, as the calculated score is higher, the processing part 100 finds a marker faster, or has higher tracking accuracy and is less likely to lose a marker when moving the marker, for example.

FIG. 6 is a diagram illustrating how the score calculation part 104 calculates a score of a marker in process of creation by way of example. As illustrated in FIG. 6, the score calculation part 104 calculates a score ("60 points") of a marker on the basis of the recognition result (such as the number of characteristic points or a distribution of characteristic points) of the captured image of the marker in process of creation in No"01", for example.

(2-1-5-2. Exemplary Calculation 2)

Further, whenever a design of the marker in process of creation is changed and the recognition result of the marker in process of creation is updated, for example, the score calculation part 104 can sequentially calculate the score of the marker in process of creation depending on the updated recognition result.

{2-1-6. Display Control Part 106}

The display control part 106 causes the display face to display assistance information for assisting in creation of a marker depending on the recognition result of the marker in process of creation by the recognition processing part 108 and the calculation result by the score calculation part 104 in association with the marker in process of creation. For example, the display control part 106 causes the assistance information to be displayed near the position corresponding to the marker in process of creation within the display face, or the assistance information to be displayed in a overlapped manner on the marker in process of creation.

(2-1-6-1. Exemplary Assistance Information 1)

Figure 8B:
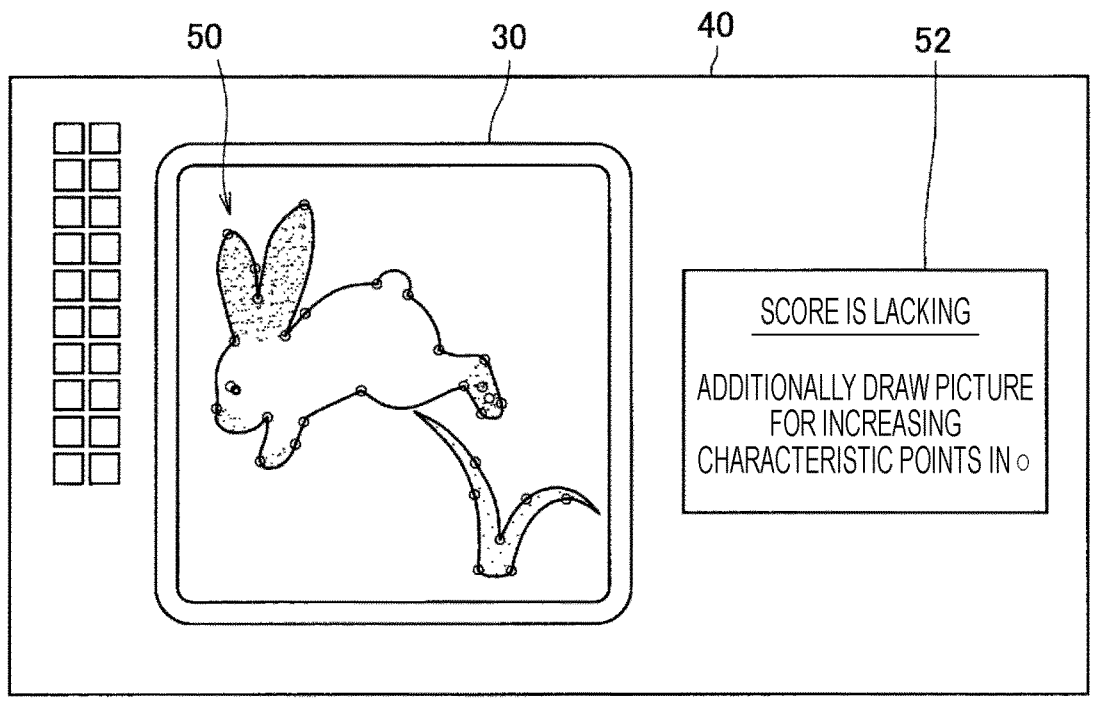
FIG. 8B is a diagram illustrating exemplary display of assistance information depending on recognition of the marker in process of creation illustrated in FIG. 8A.

Here, the assistance information can include an image depending on the recognition result of the characteristic amount of the marker in process of creation. For example, the assistance information includes an image indicating each position of at least one characteristic point recognized from the marker in process of creation. In this case, the display control part 106 may display an indication (image 50) indicating each position of at least one characteristic point recognized from the marker in process of creation to be overlapped on the marker in process of creation as illustrated in FIG. 8B. According to the exemplary display, a shape whose characteristic points are recognized (such as crossing point of a plurality of lines, or bent point of a line) can be roughly provided in notification to the user without disclosing the characteristic point recognition method by the recognition processing part 108 to the user.

(2-1-6-2. Exemplary Assistance Information 2)

Alternatively, the assistance information can include an image indicating a recommended region where at least one characteristic point is recommended to add to the marker in process of creation depending on the score calculated by the score calculation part 104. In this case, the display control part 106 may display an indication (image 54) indicating the recommended region to be overlapped on the marker in process of creation as illustrated in FIG. 8D. Additionally, the recommended region can be where a distribution of recognized characteristic points is coarser than a predetermined reference. For example, the recommended region may be where a distribution of recognized characteristic points is relatively coarser than the other regions, or may be where the density of the characteristic points is lower than a reference value (such as a region where the number of recognized characteristic points per unit area is at a predetermined threshold or less). According to the exemplary display, it is possible to assist the user to change (or additionally draw) the marker such that the score of the marker in process of creation is higher.

(2-1-6-3. Exemplary Assistance Information 3)

Figure 9A:
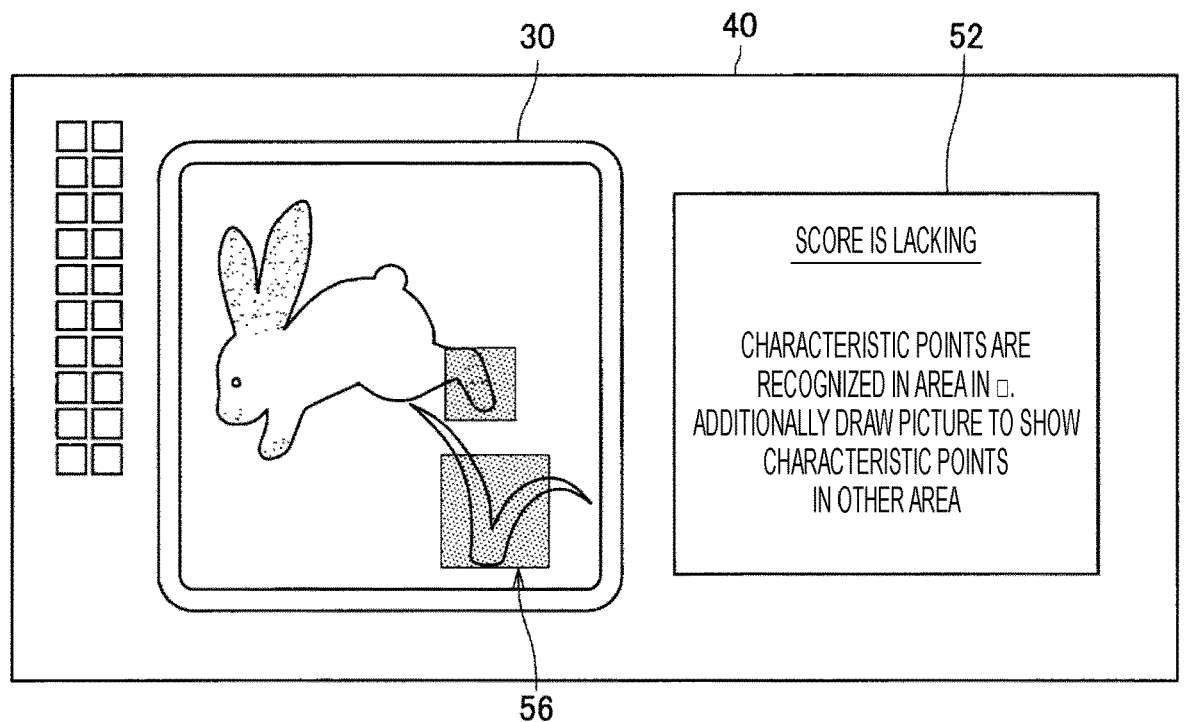
FIG. 9A is a diagram illustrating another exemplary display of assistance information depending on recognition of the marker in process of creation illustrated in FIG. 8A.

Alternatively, the assistance information can include an image indicating a region where a distribution of recognized characteristic points is denser than the predetermined reference in the marker in process of creation. For example, the region may be where a distribution of recognized characteristic points is relatively denser than the other regions or where the density of the characteristic points is higher than the reference value (such as a region where the number of recognized characteristic points per unit area is at the predetermined threshold or more). In this case, the display control part 106 may display an indication (image 56) indicating a region where a distribution of characteristic points is denser than the predetermined reference to be overlapped on the marker in process of creation as illustrated in FIG. 9A.

(2-1-6-4. Exemplary Assistance Information 4)

Alternatively, the assistance information can include information indicating the score of the marker in process of creation calculated by the score calculation part 104. For example, the display control part 106 may display a message indicating whether or not the calculated score is higher than a threshold at which the marker can be registered near the marker in process of creation as illustrated in FIG. 8B.

(2-1-6-5. Assistance Information DB 128)

The contents of display control by the display control part 106 will be described below in more detail. For example, the display control part 106 causes the display face to display the assistance information in association with the marker in process of creation depending on the contents in an assistance information DB 128 stored in the storage part 126 described below and the calculation result by the score calculation part 104.

FIG. 7 is a diagram illustrating an exemplary configuration of the assistance information DB 128. As illustrated in FIG. 7, No 1280, firing condition 1282, and processing setting 1284 are associated in the assistance information DB 128. In this case, when any of the firing conditions 1282 stored in the assistance information DB 128 is established, the display control part 106 can perform the processing indicated by processing setting 1284 associated with the firing condition 1282. In the example illustrated in FIG. 7, in a case where the score calculated by the score calculation part 104 is "70 points", the firing condition No"01" is established. Thus, the display control part 106 performs the processing indicated by processing setting corresponding to the firing condition. That is, the display control part 106 displays the area where the characteristic amount is detected in association with the marker in process of creation, and displays a message indicating that the image characteristic amount is lacking near the marker in process of creation.

As illustrated in FIG. 7, the display control part 106 can cause the display face to display assistance information with different contents depending on the score calculated by the score calculation part 104. For example, whenever a design of the marker in process of creation is changed and the score of the marker changes, the display control part 106 may change the assistance information to be displayed on the display face depending on the changed score. Additionally, the assistance information DB 128 can be realized in the form of a relational database or lookup table, for example.

As a variant, the threshold of the score used as firing condition may be dynamically changed on the basis of a predetermined reference in the assistance information DB 128. For example, the threshold of the score may be dynamically changed depending on the kind of an application. By way of example, in an application for payment or medical care, the threshold of the score may be set to be higher. Alternatively, the threshold of the score may be dynamically changed depending on the number of markers usable in an application (such as an estimated value of the number of currently-registered markers in association with the application or the total number of markers usable in the application in the future) per application, for example. For example, as the number of available markers is higher, the threshold of the score is set to be higher.

(2-1-6-6. Variant)

As a variant, the display control part 106 can further control whether or not to display the assistance information depending on a current processing mode. For example, in a case where the current processing mode is the creation mode, the display control part 106 causes the display face to display the assistance information. Further, in a case where the current processing mode is not the creation mode, the display control part 106 does not cause the display face to display the assistance information.

{2-1-7. Storage Part 126}

The storage part 126 stores various items of data or various pieces of software. For example, the storage part 126 stores the assistance information DB 128 and the marker information DB 130. The marker information DB 130 can associate and store an ID assigned to a marker, an image of the marker, and information (such as image) indicating a group of characteristic points recognized from the marker per created marker. The information stored in the marker information DB 130 can be used when the recognition processing part 108 detects or tracks a marker, or determines a similarity between a previously-registered marker and a marker in process of creation. The marker information DB 130 can be realized in the form of a relational database or lookup table, for example.

2-2. Exemplary Applications

The functional configuration of the first embodiment has been described above. Exemplary applications of the first embodiment will be described below in "2-2-1. Exemplary application 1" to "2-2-3. Exemplary application 3". "Exemplary application 1" to "Exemplary application 3" described below are examples of assisting in creation of a marker when the user creates the marker by use of a drawing tool.

{2-2-1. Exemplary Application 1}

Exemplary application 1 of the first embodiment will be first described with reference to FIG. 8A to FIG. 8F. At first, the user activates the drawing tool. Thereby, the processing part 100 sets a current processing mode at the creation mode. Then as illustrated in FIG. 8A, the user starts creating a marker 30 on a display screen 40 of the drawing tool (S11).

The input part 120 captures and acquires an image of a marker 30 in real-time while the marker 30 is being created. The recognition processing part 108 then recognizes the image acquired by the input part 120. Then, the score calculation part 104 can calculate a score of the marker 30 in real-time depending on the recognition result. For example, the score calculation part 104 calculates the score of the marker 30 at a timing illustrated in FIG. 8A to be "60 point" as in No"01" illustrated in FIG. 6.

Subsequently, the display control part 106 determines the contents of the assistance information to be displayed on the display screen 40 on the basis of the calculated score and the contents registered in the assistance information DB 128. In the example illustrated in FIG. 7, in a case where the score of the marker 30 is "60 points", the firing condition corresponding to No"01" is established. Thus, the display control part 106 displays the image 50 indicating some or all of the characteristic points recognized by the recognition processing part 108 to be overlapped on the marker 30, and displays a message 52 indicating that the characteristic points are lacking adjacent to the marker 30 as illustrated in FIG. 8B (S12).

Figure 8C:
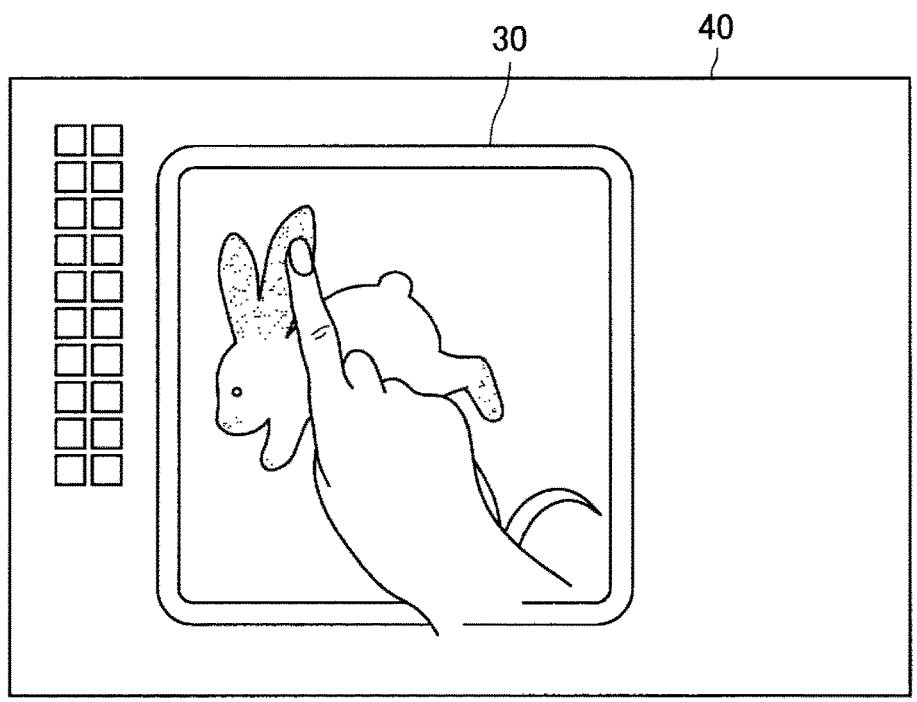
FIG. 8C is a diagram illustrating how the user additionally draws the marker in process of creation illustrated in FIG. 8A.
Figure 8D:
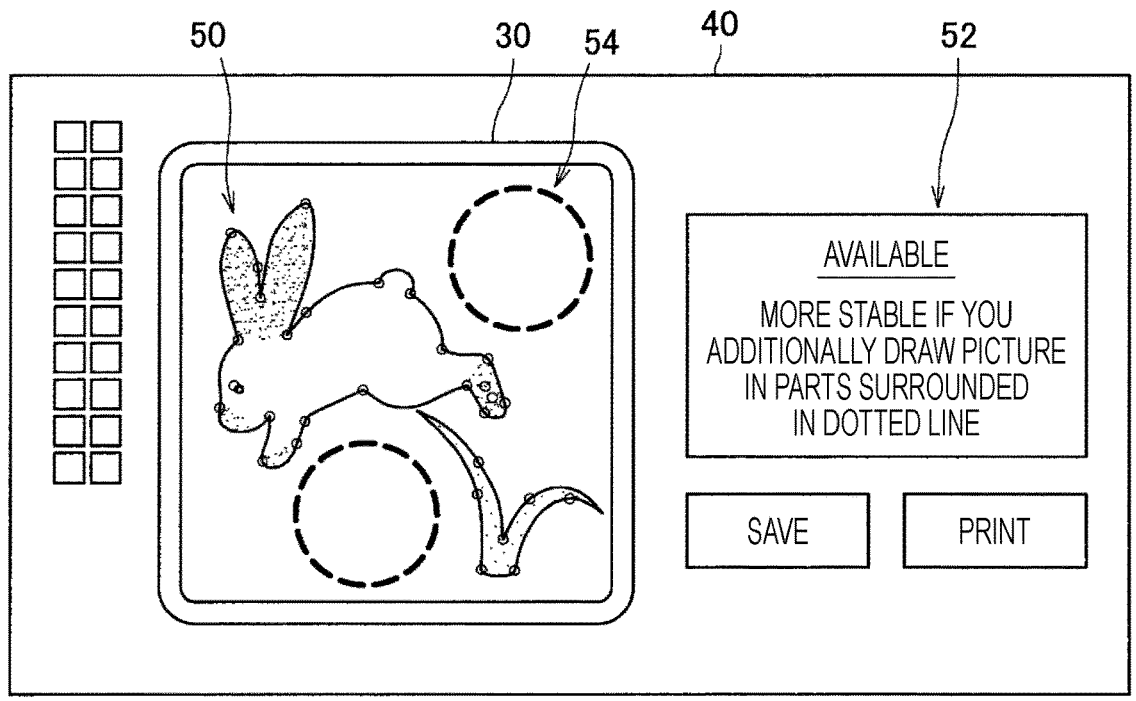
FIG. 8D is a diagram illustrating exemplary display of assistance information depending on recognition of the marker in process of creation illustrated in FIG. 8C.

Thereafter, the user additionally draws the marker 30 as illustrated in FIG. 8C (S13). Then, the recognition processing part 108 can recognize the image acquired in real-time by the input part 120 in real-time. Then, the score calculation part 104 can calculate the score of the marker 30 at a timing illustrated in FIG. 8C to be "82 points" as in No"02" illustrated in FIG. 6, for example.

In this case, in the example illustrated in FIG. 7, the firing condition corresponding to No"02" is established. Thus, the display control part 106 displays the image 50 indicating some or all of the characteristic points recognized by the recognition processing part 108 to be overlapped on the marker 30, and displays the message 52 indicating that the characteristic points are available as a marker adjacent to the marker 30 as illustrated in FIG. 8D. Further, as illustrated in FIG. 8D, the display control part 106 displays the image 54 indicating a recommended region where a picture is recommended to additionally draw to be overlapped on the marker 30 (S14). Thereby, the user can know where to additionally draw in the marker 30 in process of creation for enhancing stability of the marker 30.

Figure 8E:
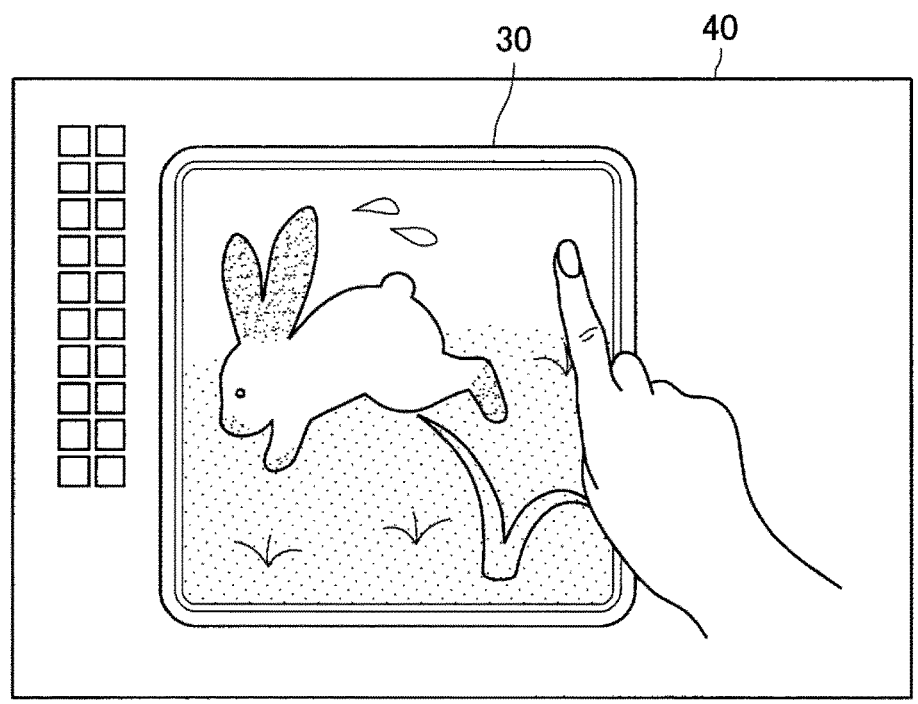
FIG. 8E is a diagram illustrating how the user additionally draws the marker in process of creation illustrated in FIG. 8C.

Thereafter, as illustrated in FIG. 8E, the user additionally draws the marker 30 (S15). Then, the recognition processing part 108 can recognize the image acquired in real-time by the input part 120 in real-time. Then, the score calculation part 104 can calculate the score of the marker 30 at a timing illustrated in FIG. 8E to be "95 points" as in No"03" illustrated in FIG. 6, for example, depending on the recognition result.

Figure 8F:
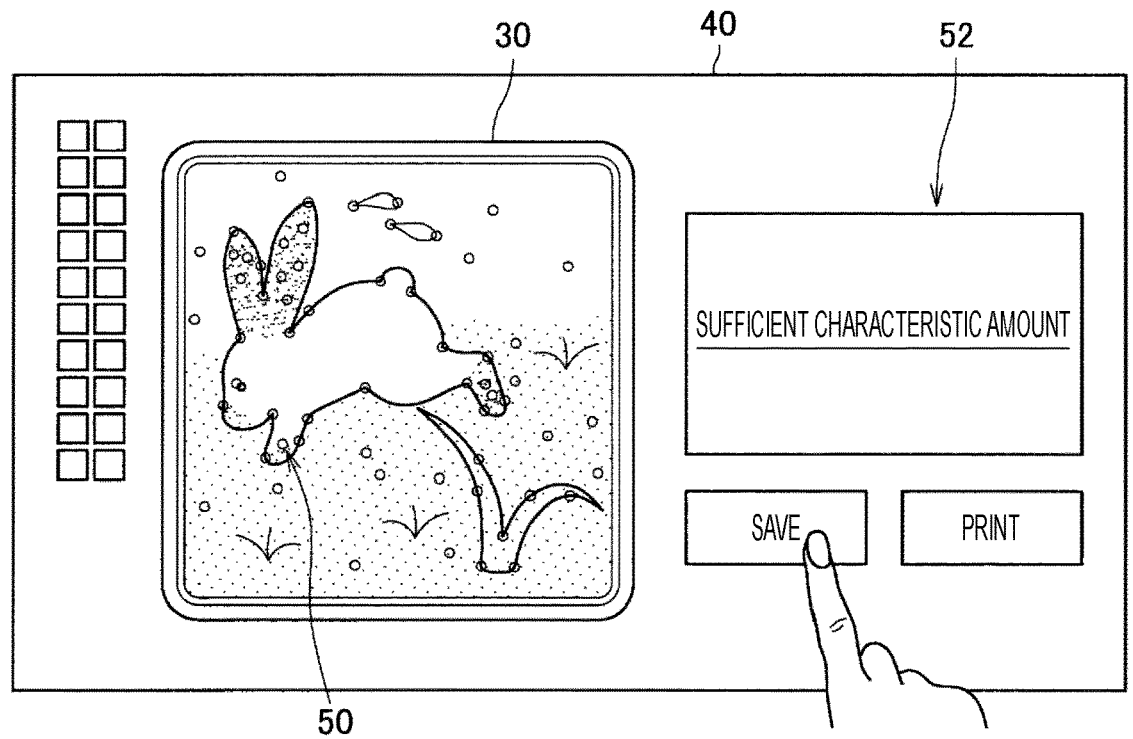
FIG. 8F is a diagram illustrating exemplary display of assistance information depending on recognition of the marker in process of creation illustrated in FIG. 8E.

In this case, in the example illustrated in FIG. 7, the firing condition corresponding to No"03" is established. Thus, the display control part 106 displays the image 50 indicating some or all of the characteristic points recognized by the recognition processing part 108 to be overlapped on the marker 30, and displays the message 52 indicating that the characteristic amount is sufficient adjacent to the marker 30 as illustrated in FIG. 8F. Thereafter, the user selects the "save button" or "print button" displayed on the display screen 40 thereby to save or print the marker 30 (S16).

{2-2-2. Exemplary Application 2}

Figure 9B:
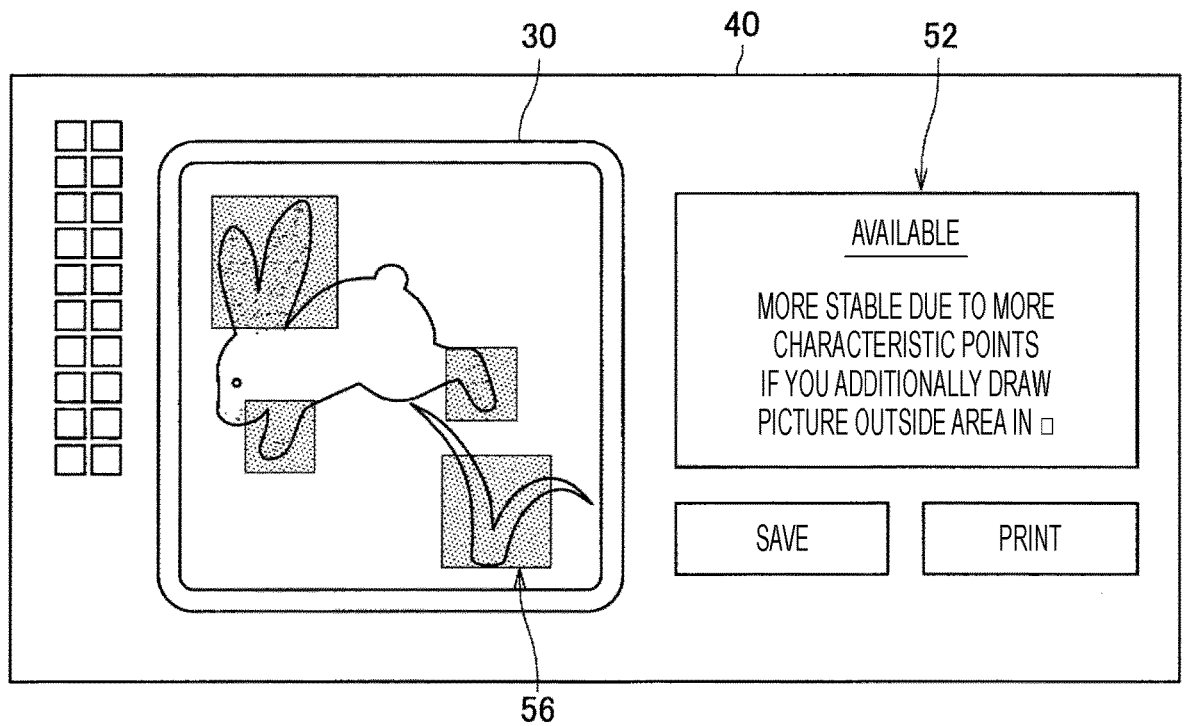
FIG. 9B is a diagram illustrating another exemplary display of assistance information depending on recognition of the marker in process of creation illustrated in FIG. 8C.
Figure 9C:
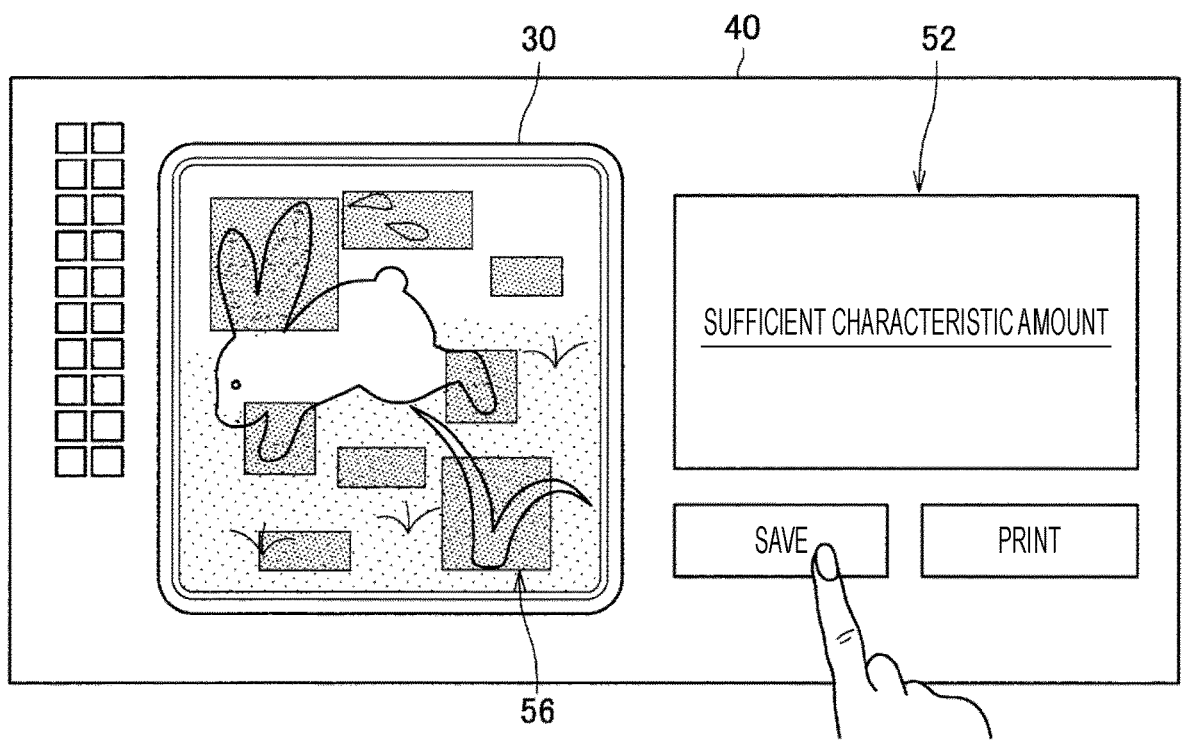
FIG. 9C is a diagram illustrating another exemplary display of assistance information depending on recognition of the marker in process of creation illustrated in FIG. 8E.

Exemplary application 2 of the first embodiment will be described below with reference to FIG. 9A to FIG. 9C. In exemplary application 2, the user first starts creating a marker 30 on the display screen 40 of the drawing tool as illustrated in FIG. 8A similarly as in exemplary application 1 (S21).

In this case, the display control part 106 displays the image 56 indicating a region where a relatively large number of characteristic points are recognized by the recognition processing part 108 (at the timing illustrated in FIG. 8A) to be overlapped on the marker 30, and displays the message 52 indicating that the characteristic points are lacking adjacent to the marker 30 as illustrated in FIG. 9A (S22). Thereby, the user can know the area where the characteristic amount is not recognized.

Thereafter, the user additionally draws the marker 30 as illustrated in FIG. 8C similarly as in exemplary application 1 (S23). In this case, the display control part 106 first updates the image 56 indicating the region where a relatively large number of characteristic points are recognized by the recognition processing part 108 (at the timing illustrated in FIG. 8C). Then, the display control part 106 displays the updated image 56 to be overlapped on the marker 30, and displays the message 52 indicating that the characteristic points are available as a marker adjacent to the marker 30 as illustrated in FIG. 9B (S24).

Thereafter, the user additionally draws the marker 30 as illustrated in FIG. 8E similarly as in exemplary application 1 (S25). In this case, the display control part 106 updates the image 56 indicating the region where a relatively large number of characteristic points are recognized by the recognition processing part 108 (at the timing illustrated in FIG. 8E). The display control part 106 then displays the updated image 56 to be overlapped on the marker 30, and displays the message 52 indicating that the characteristic amount is sufficient adjacent to the marker 30 as illustrated in FIG. 9C (S26).

According to exemplary application 2, the characteristic points themselves are not displayed unlike exemplary application 1, and a region with a relatively large number of characteristic points is instead displayed. Thus, it is possible to assist in creation of the marker 30 for enhancing reliability of the marker while avoiding the contents (such as algorithm) of the recognition processing from being known to the user.

{2-2-3. Exemplary Application 3}

Exemplary application 3 of the first embodiment will be described below with reference to FIG. 10A to FIG. 10C. In exemplary application 3, the user first starts creating a marker 30 on the display screen 40 of the drawing tool as illustrated in FIG. 8A similarly as in exemplary application 1 (S31).

Figure 10A:
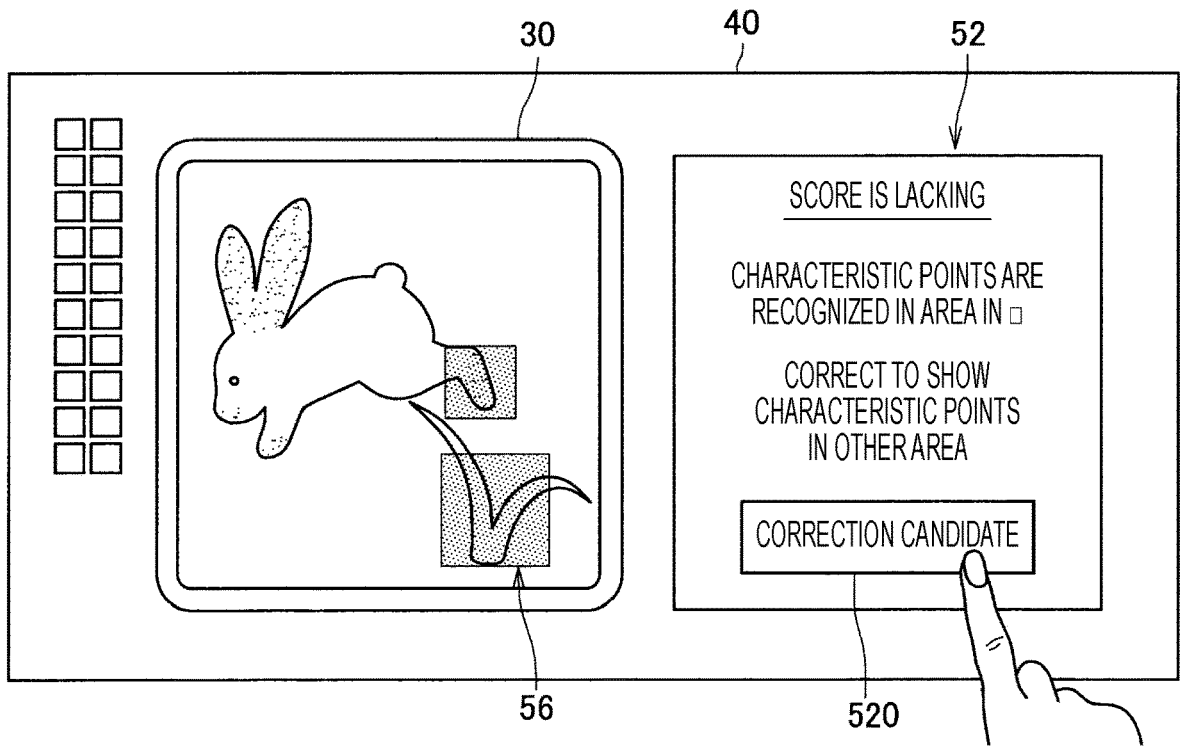
FIG. 10A is a diagram illustrating another exemplary display of assistance information depending on recognition of the marker in process of creation illustrated in FIG. 8A.

In this case, the display control part 106 displays the image 56 indicating a region where a relatively large number of characteristic points are recognized by the recognition processing part 108 (at the timing illustrated in FIG. 8A) to be overlapped on the marker 30 and displays the message 52 indicating that the characteristic points are lacking adjacent to the marker 30 as illustrated in FIG. 10A. As illustrated in FIG. 10A, the message 52 includes a select button 520 for selecting a correction candidate (S32).

Figure 10B:
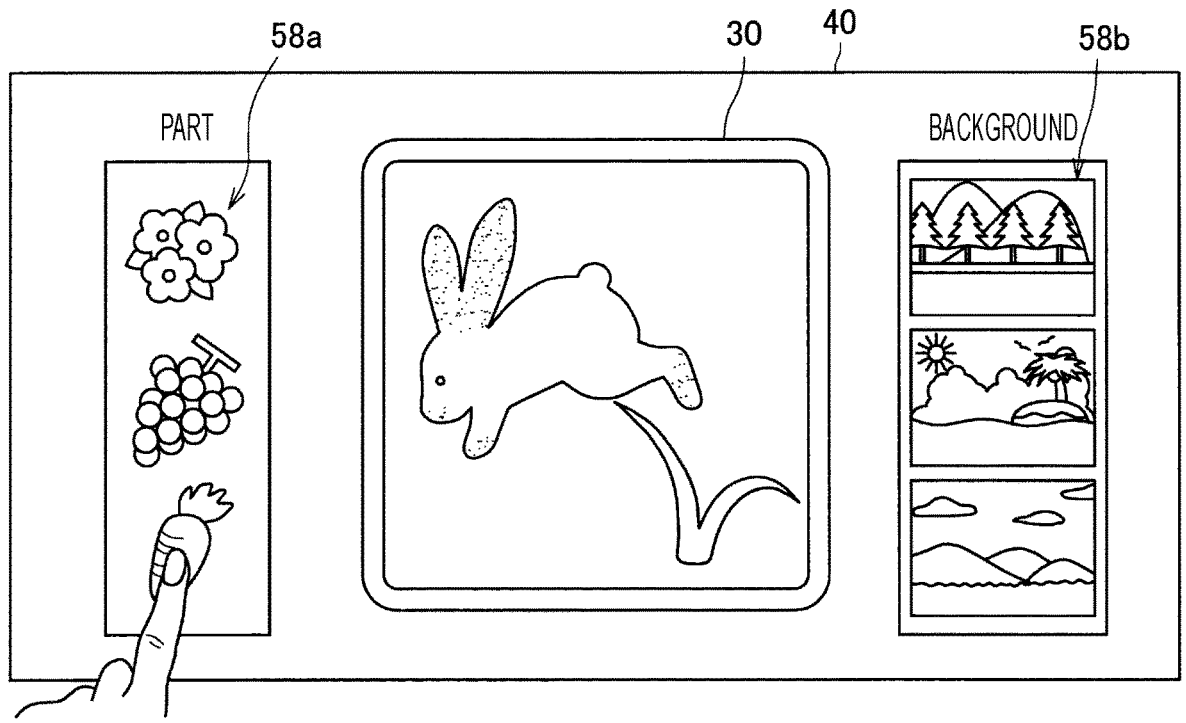
FIG. 10B is a diagram illustrating exemplary display of part or background candidates addable to the marker in process of creation illustrated in FIG. 8A.

Thereafter, in a case where the select button 520 is selected by the user, the display control part 106 displays part candidates 58a recommended to add to the marker 30 in process of creation and background candidates 58b recommended to add thereto on the display screen 40 as illustrated in FIG. 10B.

Figure 10C:
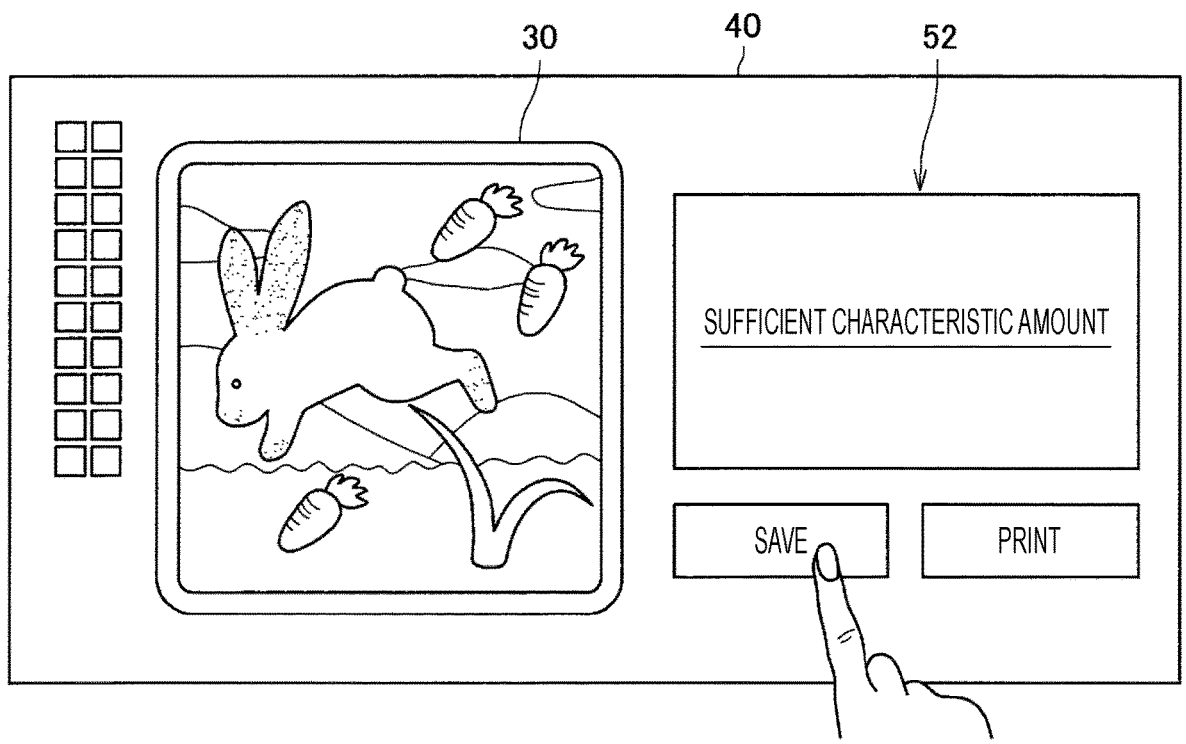
FIG. 10C is a diagram illustrating exemplary display of assistance information depending on recognition of the marker when a candidate selected on the display screen illustrated in FIG. 10B is added to the marker in process of creation illustrated in FIG. 8A.

Thereafter, when at least one of the part candidates 58a or at least one of the background candidates 58b is selected by the user, the display control part 106 automatically lays out the selected candidate on the marker 30 in process of creation such that the score of the marker 30 is higher as illustrated in FIG. 10C, for example. Alternatively, the user may arrange the candidates at desired positions by a predetermined operation (such as drag and drop operation) (S33).

According to exemplary application 3, when a desired part (or background) is selected from a plurality of prepared parts (or a plurality of prepared backgrounds) with the large characteristic amount, the selected part (or background) is automatically arranged on the marker 30 or is manually arranged by the user for the higher score of the marker 30 in process of creation. Thereby, the characteristic amount of the marker 30 can be easily increased while maintaining the design of the marker 30 in process of creation. Thus, the user can easily create a marker with higher reliability and desired design.

2-3. Flow of Processing

Figure 11:
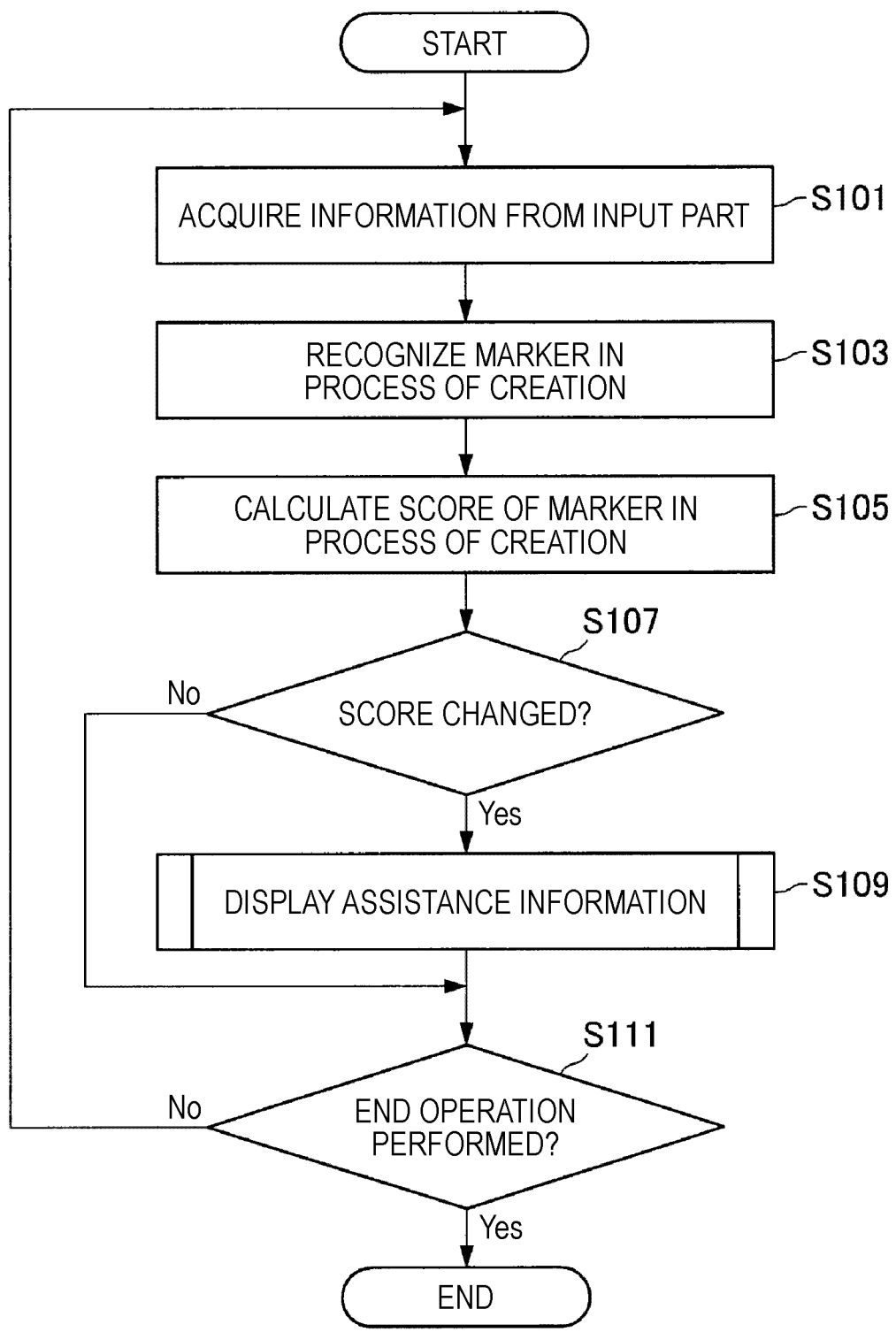
FIG. 11 is a flowchart illustrating an overall flow of processing according to the first embodiment.

Exemplary applications of the first embodiment have been described above. A flow of the processing according to the first embodiment will be described below with reference to FIG. 11 and FIG. 12. FIG. 11 is a flowchart illustrating an overall flow of the processing according to the first embodiment.

{2-3-1. Overall Flow of Processing}

As illustrated in FIG. 11, the information acquisition part 102 first receives or reads the information sensed by the input part 120 in real-time, for example, thereby acquiring it from the display processing part 122. For example, the information acquisition part 102 acquires an image of the user-creating marker captured by the input part 120 in real-time from the display processing part 122 (S101).

Subsequently, the recognition processing part 108 makes predetermined image recognition of the captured image of the marker in process of creation acquired in S101, and then recognizes the image characteristic amount of the marker in process of creation (S103).

Subsequently, the score calculation part 104 (newly) calculates the score of the marker in process of creation depending on the recognition result of the marker in process of creation recognized in S103 (S105).

Thereafter, the display control part 106 determines whether or not the newly-calculated score has changed from the previously-calculated score (S107). In a case where the newly-calculated score is the same as the previously-calculated score (S107: No), the processing part 100 performs the processing in S111 described below.

On the other hand, in a case where the newly-calculated score has changed from the previously-calculated score (or a score is calculated for the first time) (S107: Yes), the display control part 106 performs the "assistance information display processing" described below (S109).

Subsequently, the processing part 100 determines whether or not the user has performed the end operation (such as screen transition operation) (S111). In a case where the end operation has not been performed (S111: No), the processing part 100 repeatedly performs the processing in and subsequent to S101 again. On the other hand, in a case where the end operation has been performed (S111: Yes), the flow of the processing ends.

{2-3-2. Assistance Information Display Processing}

Figure 12:
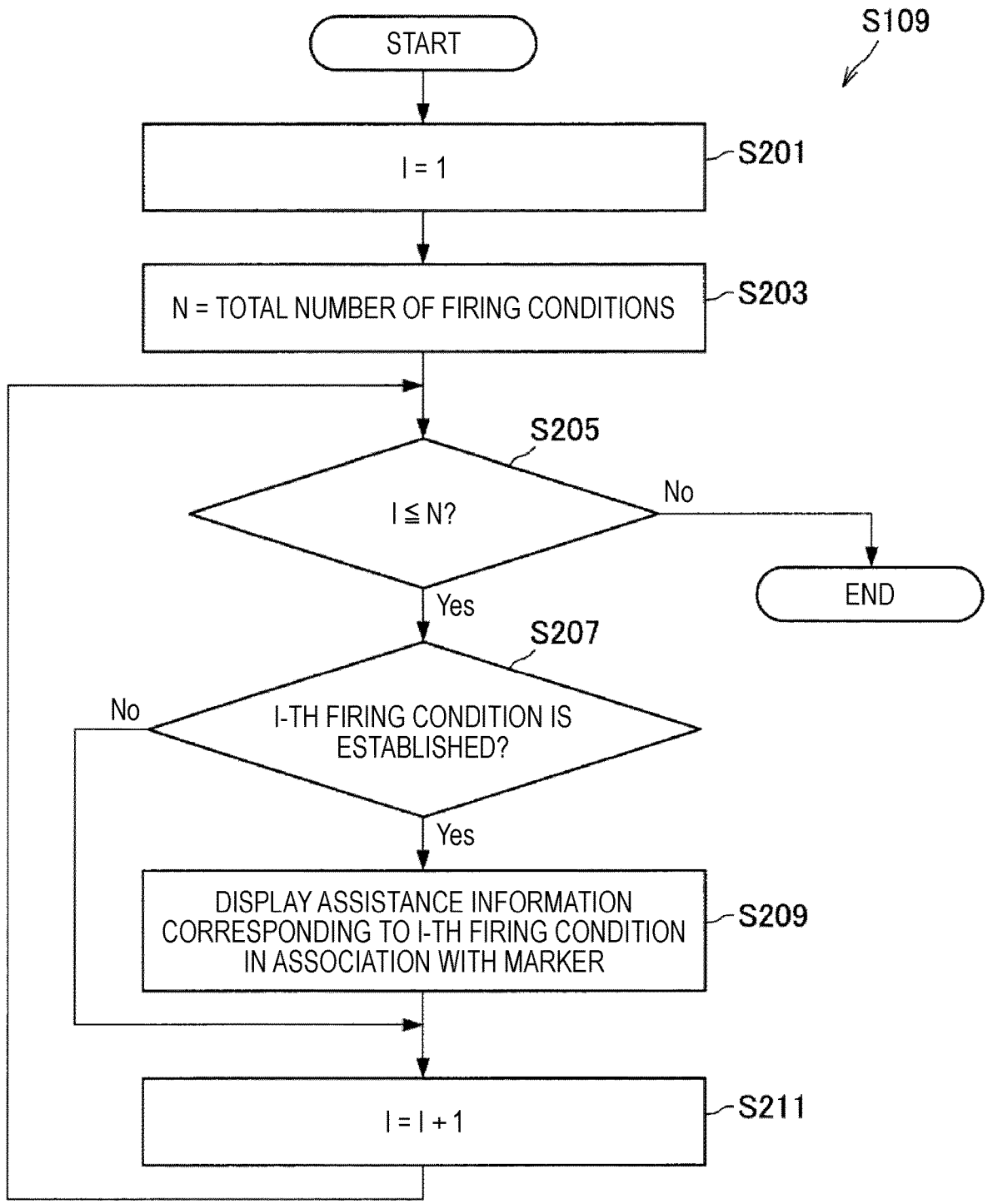
FIG. 12 is a flowchart illustrating a flow of "assistance information display processing" according to the first embodiment.

The contents of S109 ("assistance information display processing") will be described below in detail with reference to FIG. 12. As illustrated in FIG. 12, the display control part 106 first sets the variable I indicating the number of a firing condition to be processed at "1" (S201). The display control part 106 then sets the total number of firing conditions stored in the assistance information DB 128 at N (S203).

Then, the display control part 106 performs the following processing in S207 to S211 while I is N or lower (S205: Yes). Additionally, in a case where I is over N (S205: No), the "assistance information display processing" ends.

Specifically, the display control part 106 first determines whether or not the I-th firing condition stored in the assistance information DB 128 is established (S207). In a case where the I-th firing condition is not established (S207: No), the display control part 106 performs the processing in S211 described below.

On the other hand, in a case where the I-th firing condition is established (S207: Yes), the display control part 106 first specifies the processing setting associated with the I-th firing condition in the assistance information DB 128. The display control part 106 then causes the display face to display the assistance information corresponding to the processing setting in association with the marker in process of creation (S209).

Subsequently, the display control part 106 adds "1" to I (S211). Thereafter, the display control part 106 repeatedly performs the processing in and subsequent to S205 again.

2-4. Effects

{2-4-1. Effect 1}

As described above, the information processing system 10 according to the first embodiment acquires a recognition result of a user-creating marker, and then causes the display face to display assistance information depending on the recognition result in association with the marker in process of creation. Thus, it is possible to appropriately assist in creation of the marker. For example, it is possible to assist the user to efficiently create a more reliable marker.

{2-4-2. Effect 2}

Further, the information processing system 10 can calculate a score of a marker in process of creation in real-time depending on a recognition result of the characteristic amount of the user-creating marker, and can display information indicating the calculated score in association with the marker in process of creation in real-time. Thus, it is possible to interactively assist in creation of the marker.

{2-4-3. Effect 3}

Further, the information processing system 10 can display the characteristic amount recognized from a user-creating marker to be overlapped on the marker in real-time. Thus, a part contributing to an improvement in reliability of the marker can be presented to the user without disclosing the contents (such as algorithm) of the recognition processing to the user. Thus, it is possible to assist the user to easily create a more reliable marker (such as a marker with the larger characteristic amount and higher stability).

3. Second Embodiment

The first embodiment has been described above. A second embodiment of the present disclosure will be described below. As described below, according to the second embodiment, it is possible to assist the user to efficiently create a different marker (or nonanalogous marker) from the other registered markers.

3-1. Functional Configuration

A functional configuration of the second embodiment will be first described in detail. The components included in the information processing system 10 according to the second embodiment are similar to those according to the first embodiment illustrated in FIG. 5. Only the components having different functions from those in the first embodiment will be described below.

{3-1-1. Display Control Part 106}

The display control part 106 according to the second embodiment causes the display face to display assistance information depending on a comparison between a recognition result of a marker in process of creation by the recognition processing part 108 and a recognition result of at least one of the other markers stored in the marker information DB 130 in association with the marker in process of creation.

For example, the assistance information includes information indicating a comparison result of a recognition result by the recognition processing part 108 and a recognition result of each of all the other markers stored in the marker information DB 130. By way of example, the assistance information includes information indicating whether or not the maximum value of a degree of similarity between a recognition result of the characteristic amount of a marker in process of creation and a recognition result of the characteristic amount of each of all the other markers stored in the marker information DB 130 is a predetermined threshold or more. Alternatively, the assistance information includes an image of a marker whose degree of similarity with a recognition result of the characteristic amount of a marker in process of creation is the predetermined threshold or more among all the other markers stored in the marker information DB 130.

Additionally, the display control part 106 performs pattern matching on a recognition result by the recognition processing part 108 and a recognition result of each of all the other markers stored in the marker information DB 130, thereby specifying a "degree of similarity between a marker in process of creation and each of all the other markers", for example.

(3-1-1-1. Marker Information DB 130)

Figure 13:
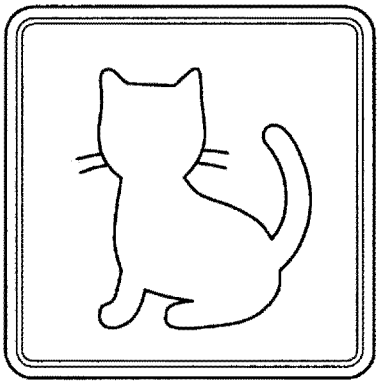
FIG. 13 is a diagram illustrating an exemplary configuration of a marker information DB 130 according to a second embodiment of the present disclosure.

FIG. 13 is a diagram illustrating an exemplary configuration of the marker information DB 130 according to the second embodiment. As illustrated in FIG. 13, ID 1300, marker 1302, and characteristic points 1304 are associated in the marker information DB 130. Here, an image of a marker assigned with a corresponding ID is stored in marker 1302. Information (such as image) indicating a group of characteristic points recognized from a corresponding marker is stored in characteristic points 1304.

The marker information DB 130 may be configured integral with an image search DB (on Cloud) connected to a communication network such as Internet. That is, the contents registered in the marker information DB 130 may be stored in the image search DB. In this case, the user can create a more elaborate marker while confirming in real-time whether or not the design of the marker in process of creation is similar to the designs previously made by unspecified users.

(3-1-1-2. Assistance Information DB 128)

Figures 14, 15A:
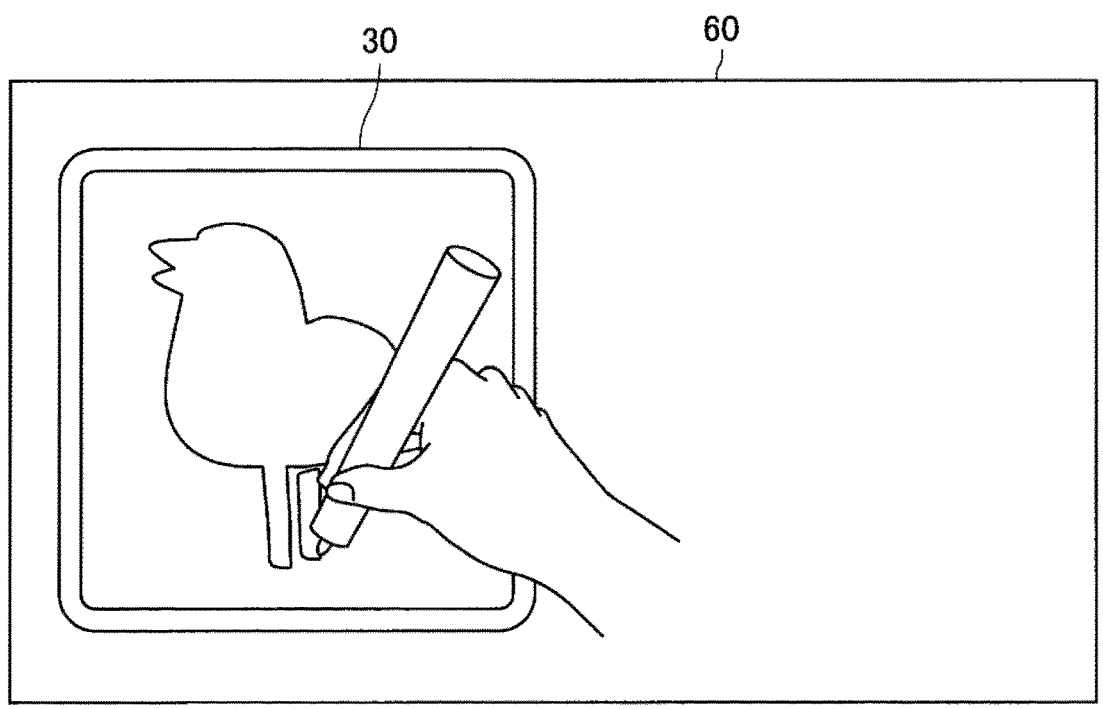
FIG. 14 is a diagram illustrating an exemplary configuration of the assistance information DB 128 according to the second embodiment.
FIG. 15A is a diagram illustrating how the user creates a marker.

FIG. 14 is a diagram illustrating an exemplary configuration of the assistance information DB 128 according to the second embodiment. In the example illustrated in FIG. 14, in a case where the marker in process of creation matches with at least one of the other markers stored in the marker information DB 130 at 50% or more of a group of characteristic points, the firing condition of No"01" is established. Thus, the display control part 106 can perform the processing indicated by the processing setting associated with the firing condition. That is, the display control part 106 can cause the display face to display a message indicating that the characteristic amount is similar to that of other marker, and the other marker at the same time.

3-2. Exemplary Applications

The functional configuration of the second embodiment has been described above. Exemplary applications of the second embodiment will be described in "3-2-1. Exemplary application 1" to "3-2-3. Exemplary application 3" below. "Exemplary application 1" and "Exemplary application 2" described below are examples in which marker creation assistance is made while the user creates a marker by use of a sheet and a pen. Further, "Exemplary application 3" is an example in which marker creation assistance is made when the user creates a marker by use of a drawing tool.

{3-2-1. Exemplary Application 1}

Exemplary application 1 of the second embodiment will be first described with reference to FIG. 15A to FIG. 15D. It is assumed below that a current processing mode is set at the creation mode.

In exemplary application 1, as illustrated in FIG. 15A, the user first starts creating a marker 30 on a sheet 60 with a pen (more specifically, drawing an illustration of a marker 30) (S41).

The input part 120 captures and acquires an image of the marker 30 in real-time while the marker 30 is being created. The recognition processing part 108 then recognizes the image acquired by the input part 120. Subsequently, the display control part 106 first compares the recognition result with the recognition result of each of all the other markers stored in the marker information DB 130.

Figure 15B:
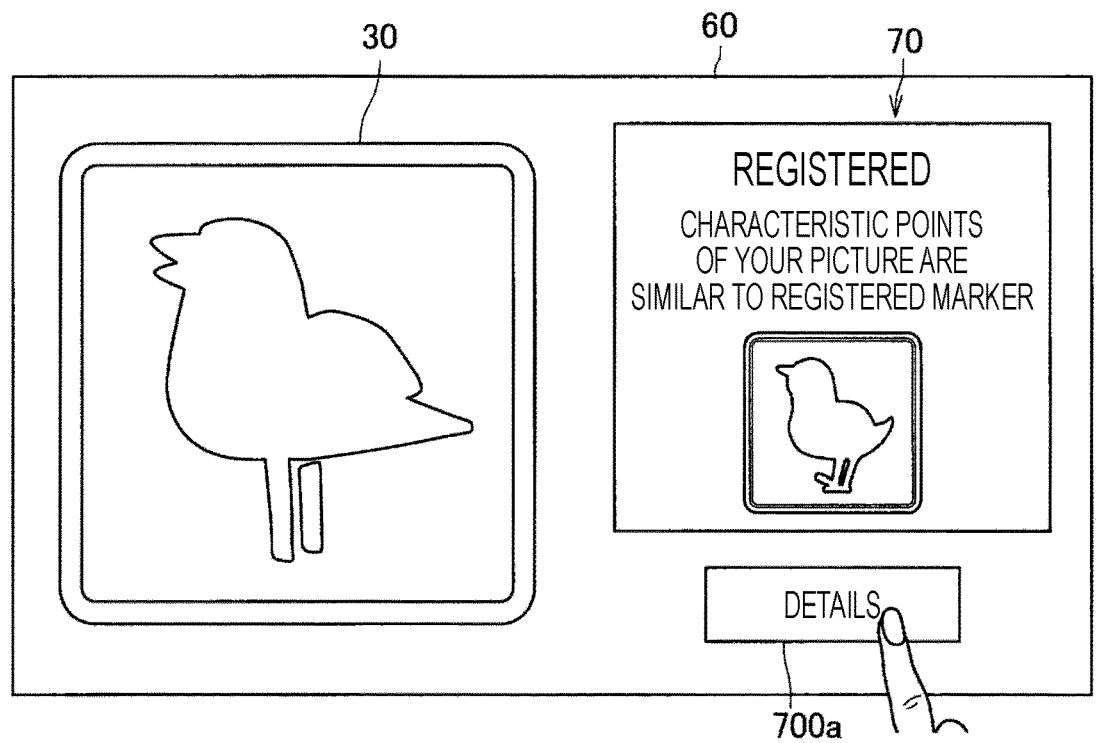
FIG. 15B is a diagram illustrating exemplary display of assistance information depending on recognition of the marker in process of creation illustrated in FIG. 15A.

The display control part 106 then determines the contents of assistance information projected onto the sheet 60 on the basis of the comparison result and the contents registered in the assistance information DB 128. For example, in the example of the assistance information DB 128 illustrated in FIG. 13, the recognition result of the characteristic amount of the marker 30 at a timing illustrated in FIG. 15A is higher by 50% of the degree of similarity than the recognition result of the characteristic amount of the marker corresponding to No"02" Thus, in the example of the assistance information DB 128 illustrated in FIG. 14, the firing condition corresponding to No"01" is established. Thus, the display control part 106 causes the display part 124 to project assistance information 70 including a message indicating that the characteristic amount is similar to that of other marker, the other marker, and a details button 700a adjacent to the marker 30 in process of creation as illustrated in FIG. 15B. The details button 700a is a UI button for displaying similar contents in detail (S42).

Figure 15C:
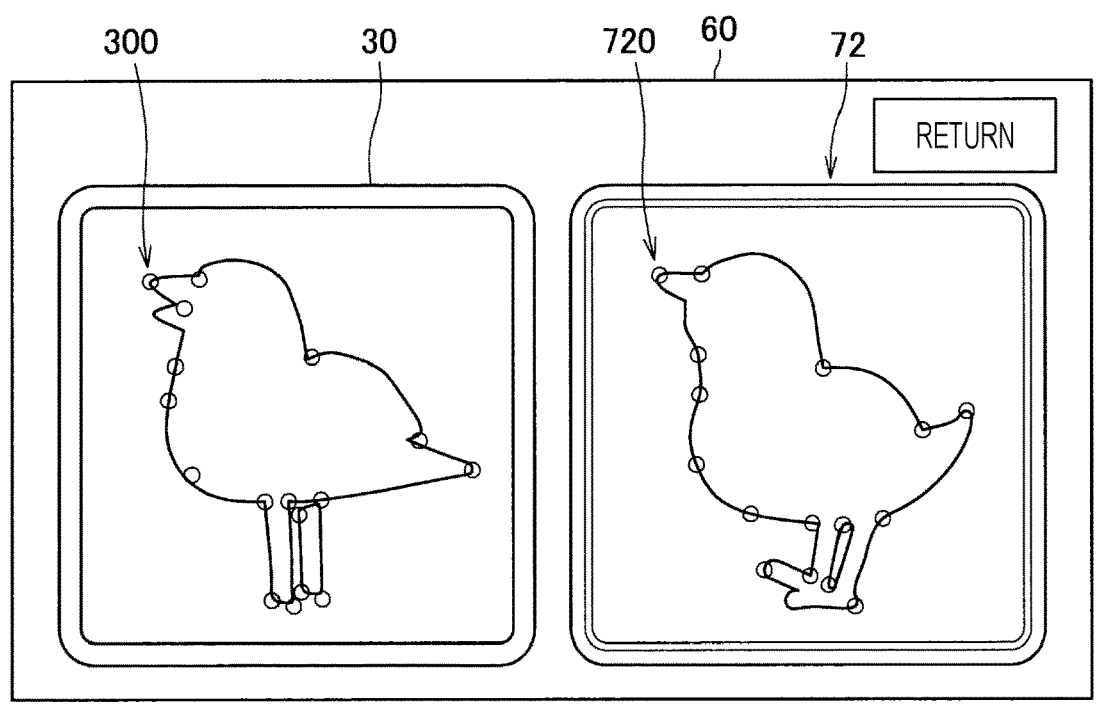
FIG. 15C is a diagram illustrating exemplary display of assistance information when a details button illustrated in FIG. 15B is selected.

Thereafter, in a case where the details button 700a is selected by the user, the display control part 106 causes the display part 124 to project an image 300 indicating some or all of the characteristic points recognized from the marker 30 onto the marker 30 as illustrated in FIG. 15C. At the same time, the display control part 106 causes the display part 124 to project an image 72 of the other marker adjacent to the marker 30, and to display an image 720 indicating some or all of the characteristic points recognized from the other marker to be overlapped on the image 72 of the other marker (S43). Thereby, the user can specifically confirm which part is similar to the registered markers.

Figure 15D:
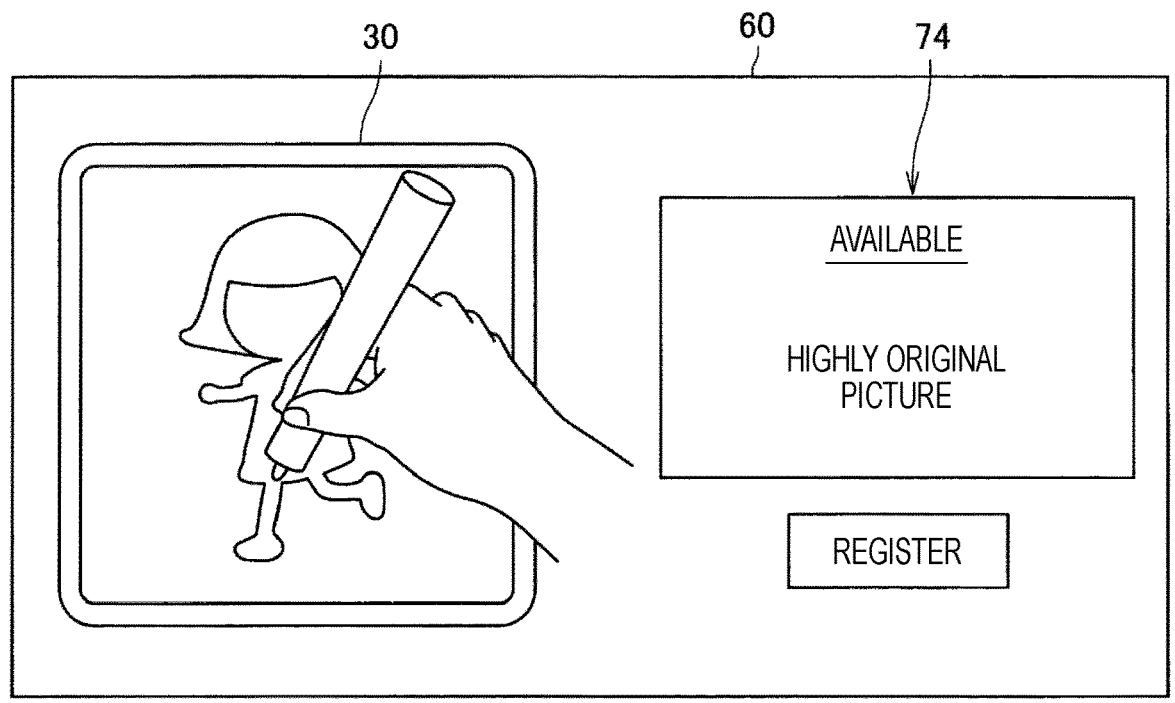
FIG. 15D is a diagram illustrating exemplary display of assistance information depending on recognition of user-redrawn marker.

Thereafter, the user redraws a different picture from "picture of bird" with a pen. Then, in a case where it is determined that the redrawn picture is not similar to any marker stored in the marker information DB 130, the display control part 106 causes the display part 124 to project a message 74 indicating that the redrawn picture is available as a marker adjacent to the redrawn picture 30 as illustrated in FIG. 15D. Thereafter, in a case where the user selects the "register button" projected onto the sheet 60, the processing part 100 additionally registers an image of the redrawn picture 30 (as a marker) in the marker information DB 130 (S44).

{3-2-2. Exemplary Application 2}

Exemplary application 2 of the second embodiment will be described below with reference to FIG. 16A to FIG. 16C. In exemplary application 2, the user first draws an illustration of a marker 30 on the sheet 60 with a pen similarly as in exemplary application 1 (S51).

Then, similarly as in exemplary application 1, the recognition processing part 108 recognizes the image of the marker 30 acquired by the input part 120. Subsequently, the display control part 106 compares the recognition result with the recognition result of each of all the other markers stored in the marker information DB 130.

Figure 16A:
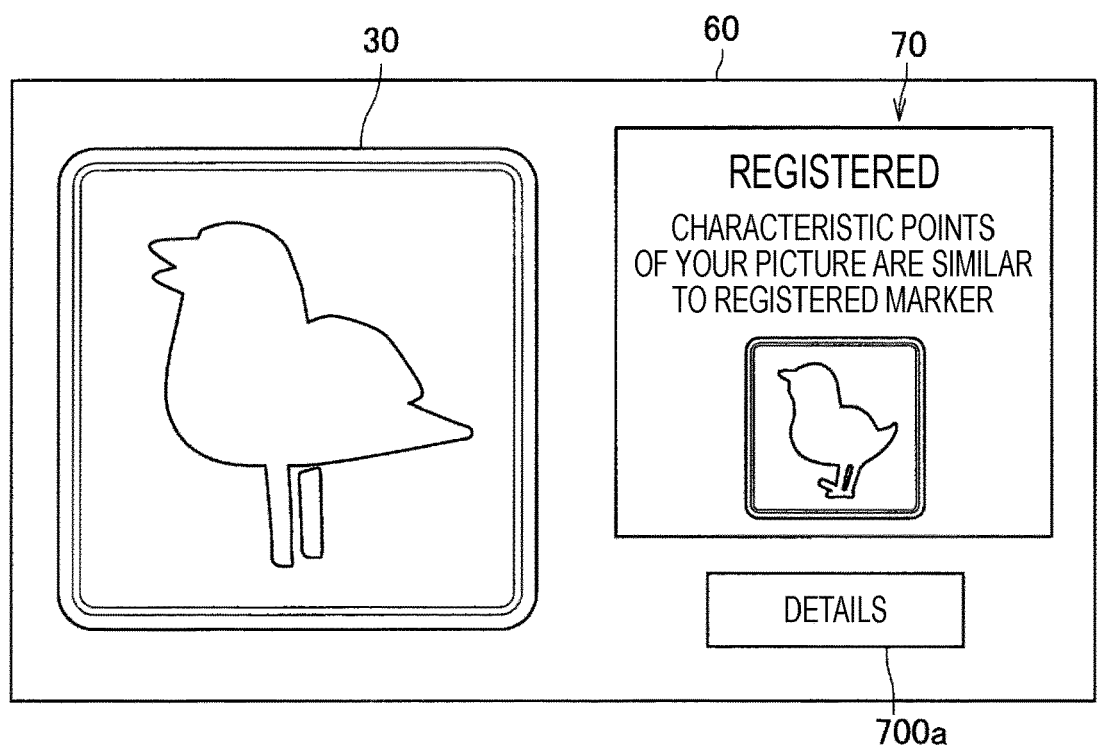
FIG. 16A is a diagram illustrating exemplary display of assistance information depending on recognition of a user-creating marker.

In a case where the degree of similarity between the recognition result of any other marker stored in the marker information DB 130 and the recognition result of the marker 30 is at a predetermined threshold or more, the display control part 106 causes the display part 124 to project the assistance information 70 including a message indicating that the characteristic amount is similar to that of other marker, the other marker, and the details button 700a adjacent to the marker 30 in process of creation as illustrated in FIG. 16A (S52).

Figure 16B:
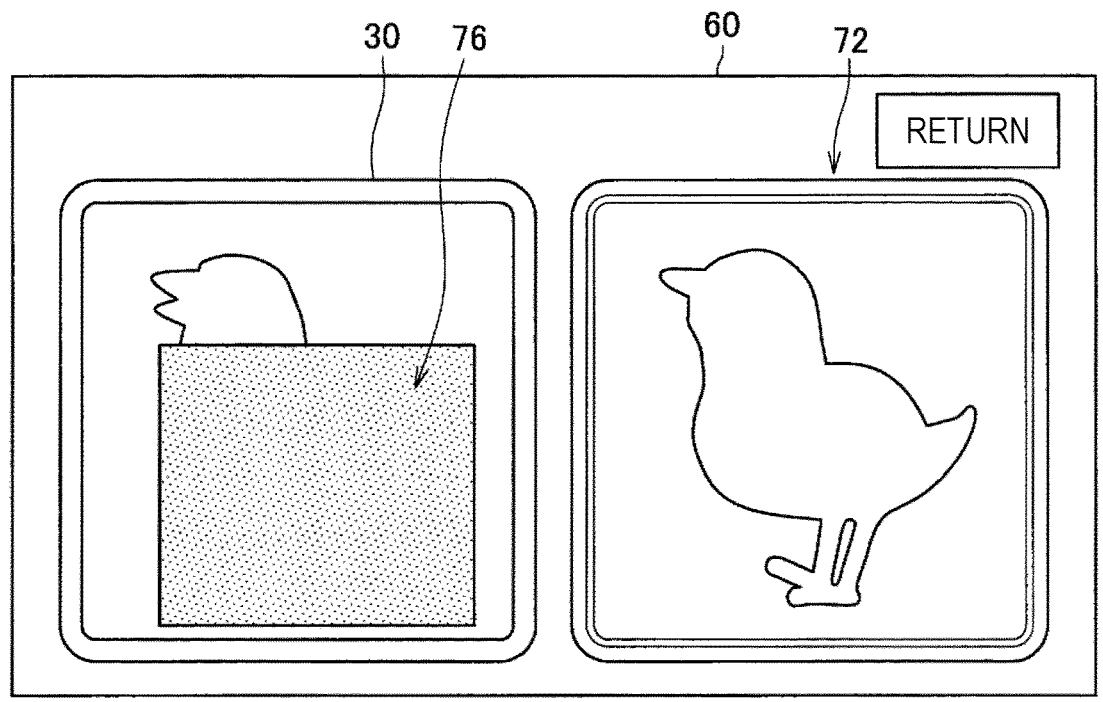
FIG. 16B is a diagram illustrating exemplary display of assistance information when the details button illustrated in FIG. 16A is selected.

Thereafter, in a case where the details button 700a is selected by the user, the display control part 106 causes the display part 124 to project a rectangle 76 in a predetermined color indicating a part where the degree of similarity between the marker 30 in process of creation and the other marker is high onto the marker 30 as illustrated in FIG. 16B (S53). Thereby, the user can specifically confirm which part is similar to the other registered marker. For example, the user can confirm that the degree of similarity of the head between the marker 30 in process of creation and the other marker is low while the degree of similarity of the body therebetween is high.

Figure 16C:
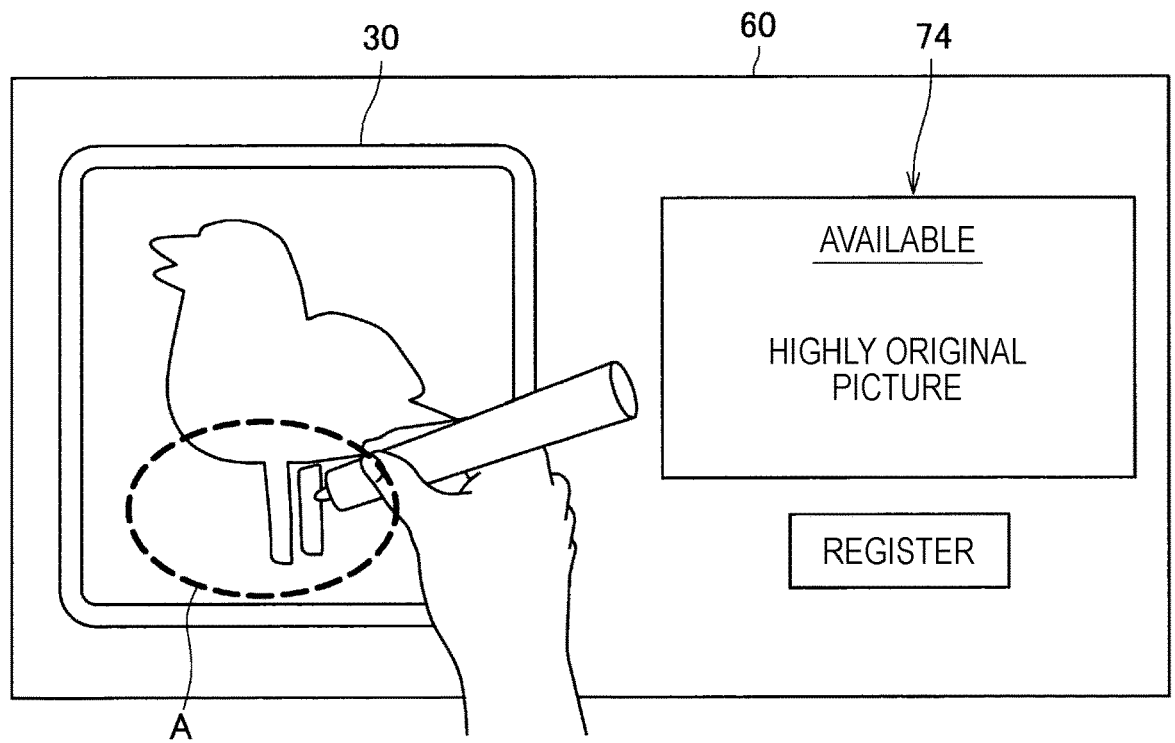
FIG. 16C is a diagram illustrating exemplary display of assistance information depending on recognition of the marker when the user redraws the marker illustrated in FIG. 16A.

Thereafter, as in a broken line A illustrated in FIG. 16C, for example, the user redraws only the body part with a pen. Then, in a case where the redrawn picture is not similar to any marker stored in the marker information DB 130, the display control part 106 causes the display part 124 to project the message 74 indicating that the redrawn picture is available as a marker adjacent to the redrawn picture 30 as illustrated in FIG. 16C (S54).

In exemplary application 2, the user has only to redraw only the designated part, and thus can more efficiently create the original marker 30 than in exemplary application 1. Further, in exemplary application 2, the characteristic points are not displayed as they are unlike exemplary application 1, and a region with a high degree of similarity is instead displayed in a rectangle or the like. Thus, the contents (such as algorithm) of the recognition processing can be avoided from being known to the user.

{3-2-3. Exemplary Application 3}

Exemplary application 3 of the second embodiment will be described below with reference to FIG. 17A to FIG. 17D. Additionally, exemplary application 3 assumes that the characteristic amount used for the recognition processing (by the recognition processing part 108) includes not only the geometric characteristic amount but also color.

Figure 17A:
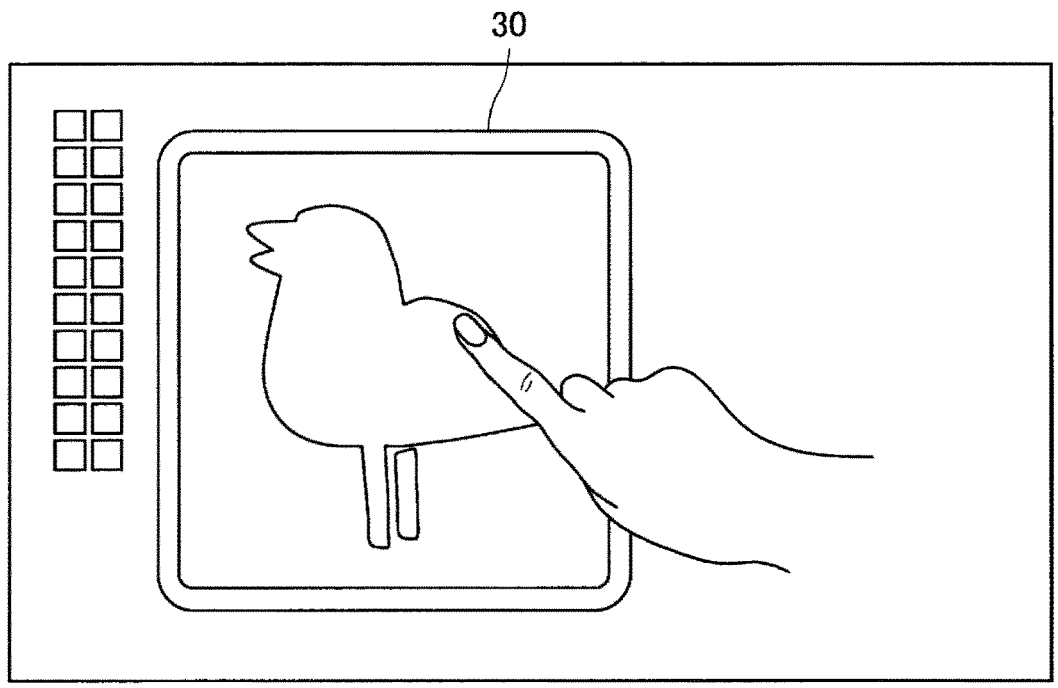
FIG. 17A is a diagram illustrating how the user is creating a marker.

In exemplary application 3, the user first activates the drawing tool. As illustrated in FIG. 17A, the user then starts creating a marker 30 on the display screen of the drawing tool (S61).

Similarly as in exemplary application 1, the recognition processing part 108 then recognizes the image of the marker 30 acquired by the input part 120. Subsequently, the display control part 106 compares the recognition result with the recognition result of each of all the other markers stored in the marker information DB 130.

Figure 17B:
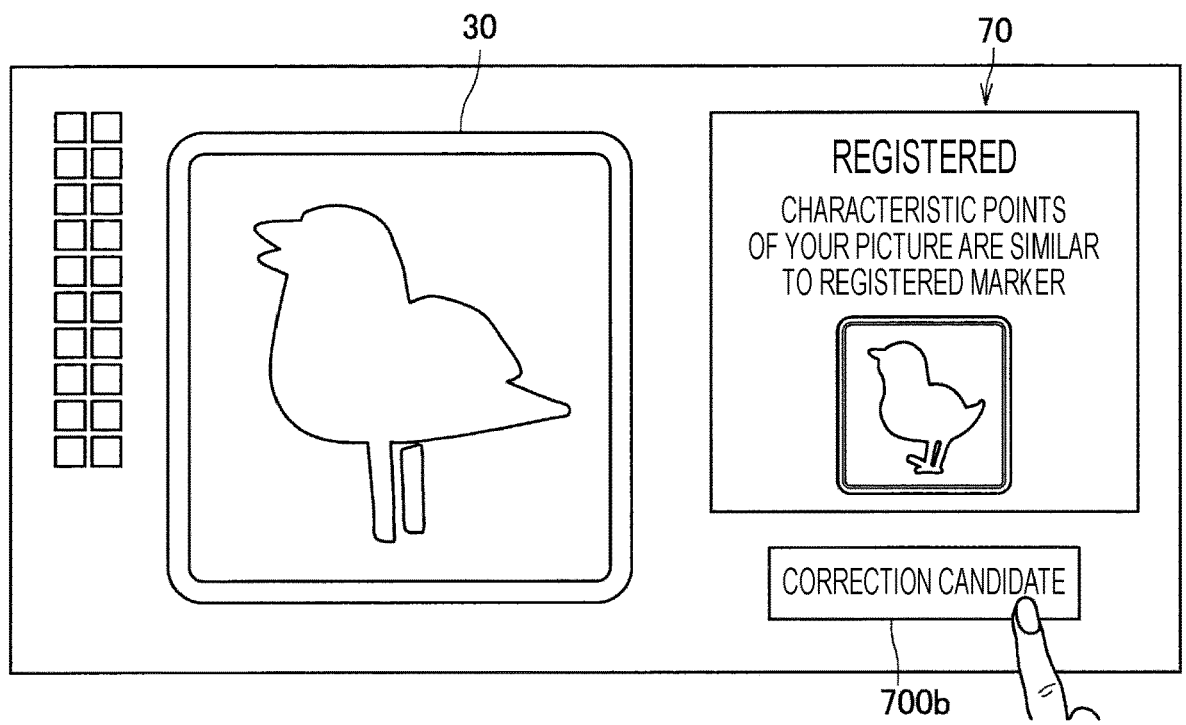
FIG. 17B is a diagram illustrating exemplary display of assistance information depending on recognition of the marker in process of creation illustrated in FIG. 17A.

Then in a case where the degree of similarity between the recognition result of any other marker stored in the marker information DB 130 and the recognition result of the marker 30 in process of creation is at a predetermined threshold or more, the display control part 106 displays the assistance information 70 including a message indicating that the characteristic amount is similar to that of other marker, the other marker, and a correction candidate button 700b adjacent to the marker 30 as illustrated in FIG. 17B. The correction candidate button 700b is a UI button for displaying a plurality of correction candidate images. The plurality of correction candidates includes images which use the design of the marker 30 in process of creation and are changed in orientation, the number, color, or the like of the design such that the characteristic amount is not similar to that of the other marker (S62).

Figure 17C:
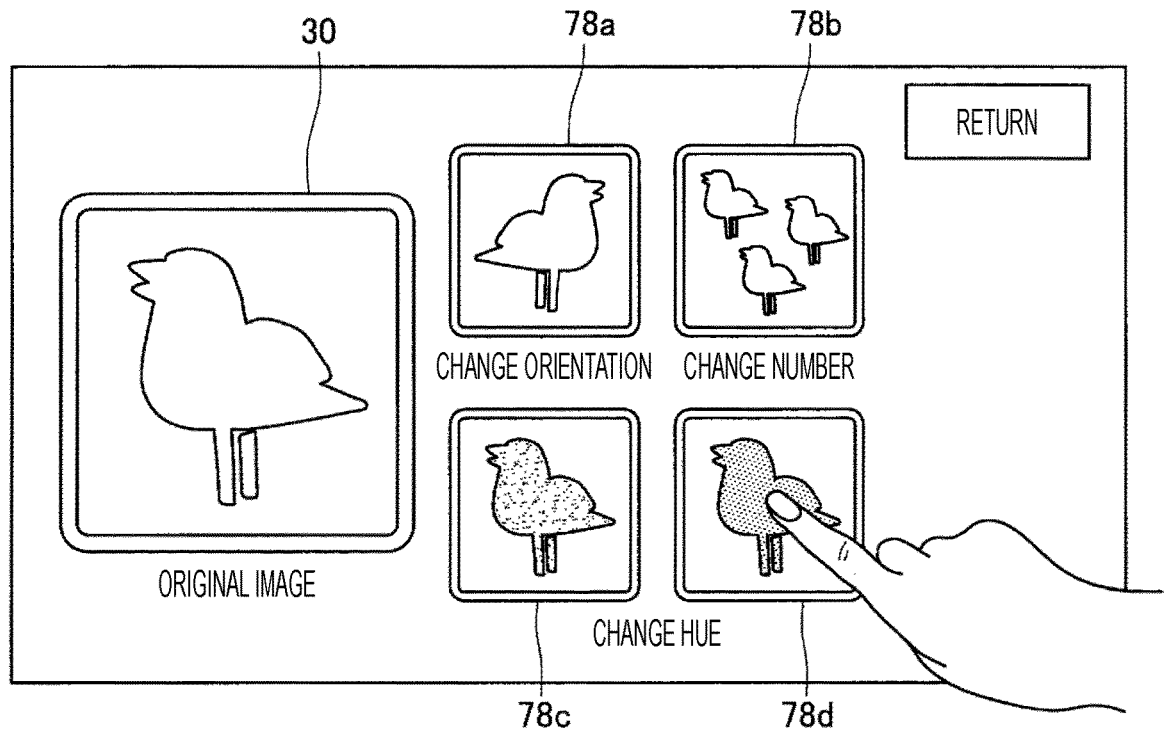
FIG. 17C is a diagram illustrating exemplary display of assistance information when a correction candidate button illustrated in FIG. 17B is selected.

Thereafter, in a case where the correction candidate button 700b is selected by the user, the display control part 106 displays a plurality of correction candidate images 78 (specifically, a candidate image 78a in which the orientation of "bird" in the marker 30 is changed, a candidate image 78b in which the number of "birds" in the marker 30 increases, and a candidate image 78c and a candidate image 78d in which the hue of "bird" in the marker 30 is changed) adjacent to the marker 30 as illustrated in FIG. 17C (S63).

Figure 17D:
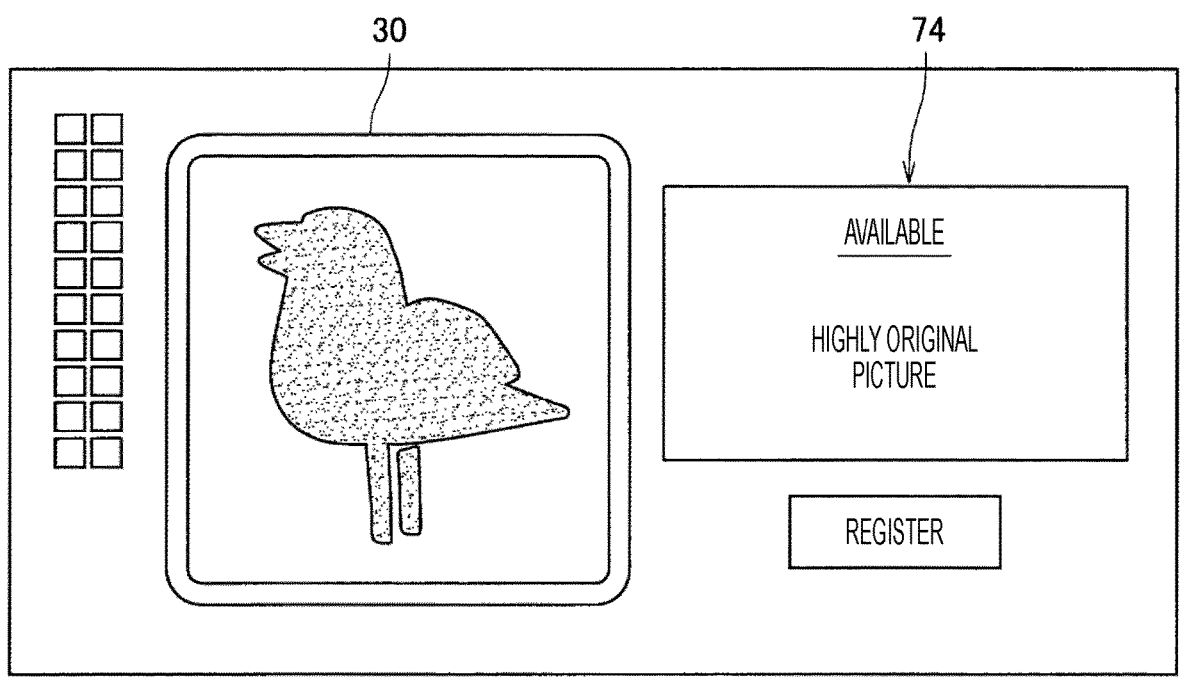
FIG. 17D is a diagram illustrating exemplary display of assistance information depending on recognition of a marker corresponding to a candidate selected on the display screen illustrated in FIG. 17C.

It is assumed that the candidate image 78d is selected later by the user and the candidate image 78d is not similar to any other marker stored in the marker information DB 130. In this case, the display control part 106 displays the message 74 indicating that the candidate image 78d is available as a marker and the candidate image 78d on the display screen as illustrated in FIG. 17D.

In exemplary application 3, a correction candidate which is mechanically (automatically) changed in image characteristics (such as orientation, number, and color) can be presented to the user as far as the design of the marker 30 in process of creation does not largely change. Thus, the user selects a desired correction candidate thereby to efficiently create the original marker 30.

3-3. Effect

As described above, the information processing system 10 according to the second embodiment acquires a recognition result of a user-creating marker, and causes the display face to display assistance information depending on a comparison between the recognition result of the marker in process of creation and the recognition result of each of all the other markers stored in the marker information DB 130 in association with the marker in process of creation. Thus, it is possible to assist the user to efficiently create a marker not similar to the other registered markers.

For example, the user can create a more elaborate marker while confirming in real-time whether or not the design of the marker in process of creation is similar to the designs previously made by other users.

4. Third Embodiment

The second embodiment has been described above. A third embodiment of the present disclosure will be described below. As described below, according to the third embodiment, it is possible to appropriately assist in creation of a marker (such as infrared (IR) marker) for an invisible ray (such as infrared ray or ultraviolet ray) with a different wavelength band from a visible ray.

4-1. Outline

Figure 18A:
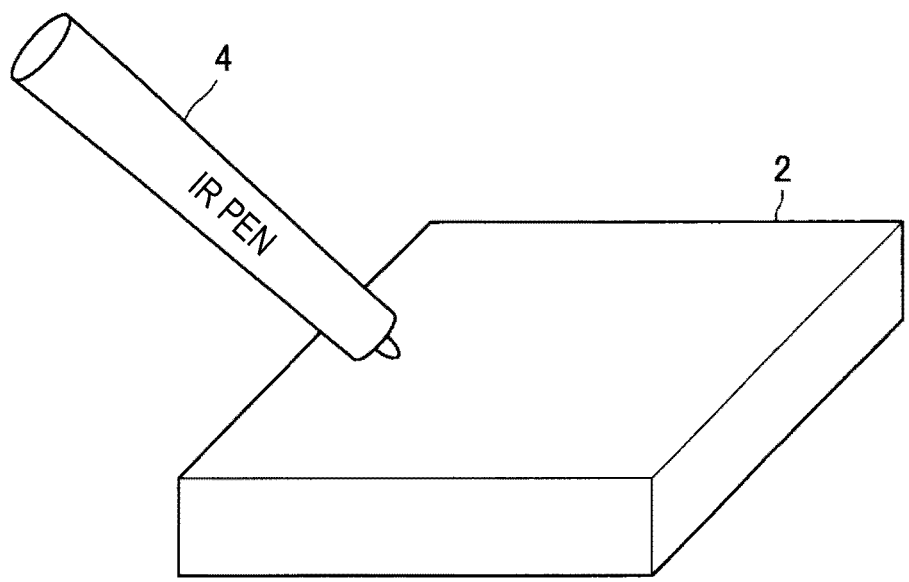
FIG. 18A is a diagram illustrating how the user draws a picture on an object by use of an IR paint pen.
Figure 18B:
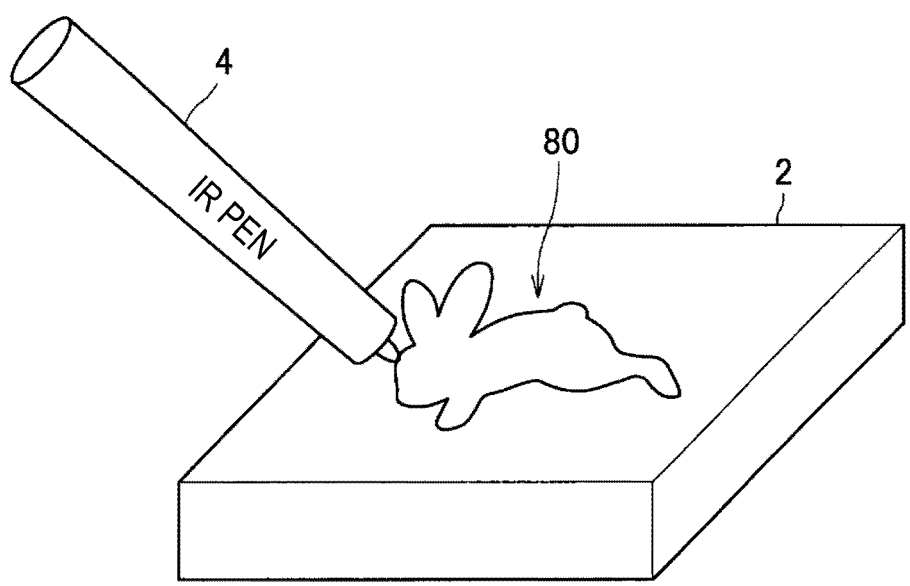
FIG. 18B is a diagram illustrating how the user draws a picture on the object by use of the IR paint pen.

The third embodiment mainly assumes that the user draws a picture by use of an invisible ink (such as IR pen) of invisible-ray reflective type thereby to create an invisible-ray marker. For example, the user draws a picture on an object 2 with an IR paint pen 4 thereby to create an IR marker 80 as illustrated in FIG. 18A and FIG. 18B. In this case, the IR paint added on the object 2 can be used as the IR marker 80.

Figure 19A:
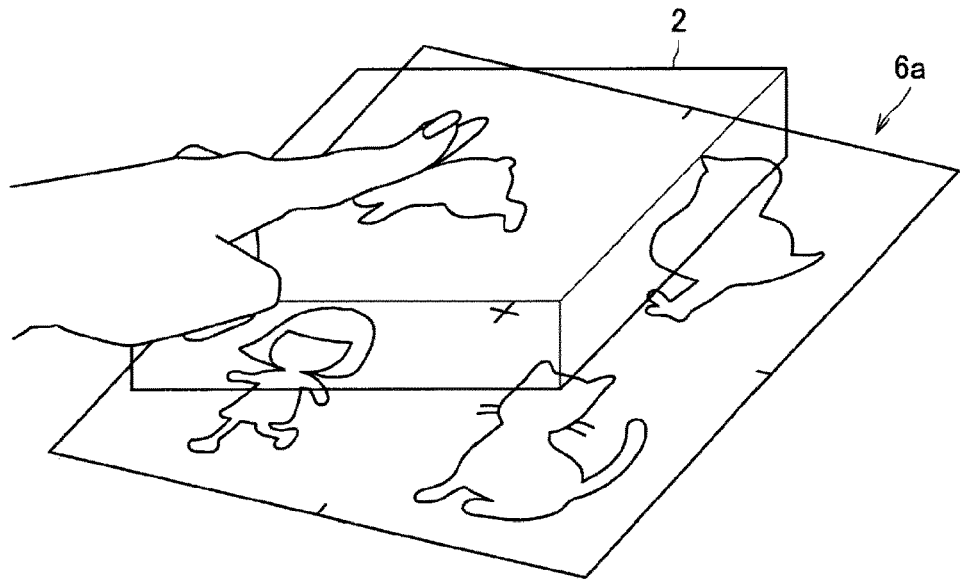
FIG. 19A is a diagram illustrating how the user rubs an IR transfer seal on the object.
Figure 19B:
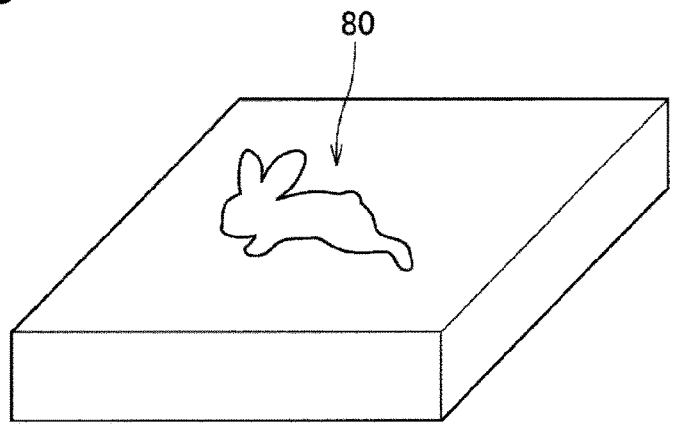
FIG. 19B is a diagram illustrating how the user rubs the IR transfer seal on the object.

Alternatively, the user rubs an IR transfer seal 6a on the object 2 thereby to create the IR marker 80 as illustrated in FIG. 19A and FIG. 19B. In this case, the IR paint rubbed on the object 2 can be used as the IR marker 80.

Figure 20:
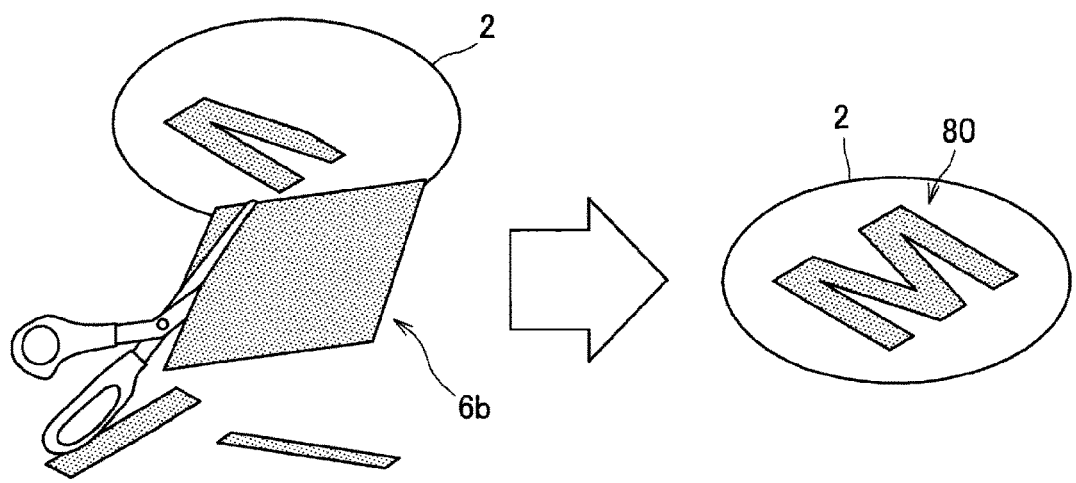
FIG. 20 is a diagram illustrating how the user applies part of an IR paint sheet on the object.

Alternatively, the user cuts an IR paint sheet 6b with scissors or the like and applies the cut IR paint sheet 6b on the object 2 thereby to create the IR marker 80 as illustrated in FIG. 20. In this case, the IR paint sheet 6b applied on the object 2 can be used as the IR marker 80.

The IR paint added on the object 2 is invisible to human eyes under a visible ray. Thus, the IR marker 80 is created as described above thereby to discriminate the object 2 having just the same physical characteristic amount. Further, an invisible marker function can be given to a commercially available product later.

Additionally, the components included in the information processing system 10 according to the third embodiment is similar to those according to the first embodiment illustrated in FIG. 5.

4-2. Example 1

Example 1 of the third embodiment will be described below. In example 1, the user first draws a picture on an object (such as sheet or plate) by use of an invisible ink (such as IR pen) of invisible-ray reflective type thereby to start creating a marker (invisible-ray marker).

In this case, an invisible ray irradiation part (included in the display part 124) can irradiate the marker in process of creation with an invisible ray under control of the display control part 106. For example, the invisible ray irradiation part irradiates the marker in process of creation with an infrared ray.

At the same time, an invisible-ray camera (included in the input part 120) can sense the marker in process of creation by use of an invisible ray in real-time, for example. For example, the invisible-ray camera captures the user-drawn contents in real-time.

Thereafter, the recognition processing part 108 can make predetermined recognition of the sensing result (such as captured image) by the invisible-ray camera in real-time, for example. For example, the recognition processing part 108 recognizes a trajectory of the IR pen (invisible ink) on the object on the basis of the image captured by the invisible-ray camera.

Subsequently, the information acquisition part 102 can acquire the recognition result by the recognition processing part 108. Thereafter, the display control part 106 can cause the display part 124 to irradiate the marker in process of creation with a visible ray as assistance information on the basis of the recognition result. For example, the display control part 106 displays (or projects) the visible ray indicating the recognition result to be overlapped on the marker in process of creation in real-time, for example. Thereby, the trajectory of the IR pen on the object recognized by the recognition processing part 108 is projected onto the marker in process of creation in the visible ray to be visualized, for example. Therefore, the IR paint is visualized thereby to facilitate the IR marker creation work as illustrated in FIG. 18B, FIG. 19B, and FIG. 20, for example.

4-3. Example 2

Example 1 has been described above. Example 2 of the third embodiment will be described below. Example 2 assumes that the user creates an invisible-ray marker by use of a pen using a fluorescent invisible ink or an invisible ink of invisible-ray absorption type. Additionally, the fluorescent invisible ink is an ink emitting fluorescence when irradiated with an ultraviolet ray, or the like. Further, when the invisible ink of invisible-ray absorption type is irradiated with an ultraviolet ray, the ink absorbs the ultraviolet ray and thus the drawn part can be displayed to be dark.

In this case, the invisible ray irradiation part can irradiate the marker in process of creation with an ultraviolet ray by a black light or the like under control of the display control part 106. Thereby, the user-drawn contents (such as trajectory of the pen using an invisible ink) can be visualized.

At the same time, a visible-ray camera (included in the input part 120) can capture the visualized drawn contents in real-time, for example.

Then, the recognition processing part 108 can recognize the drawn contents on the basis of the captured image. Then, the display control part 106 can cause the display part 124 to display the assistance information (such as an image indicating the positions of the individual characteristic points recognized from the captured image) depending on the recognition result by a visible ray in association with the marker in process of creation in real-time, for example. In a case where the assistance information is displayed (or projected), one or a combination of various items of assistance information described in the first embodiment and the second embodiment may be used.

4-3. Effect

As described above, according to the third embodiment, it is possible to facilitate the invisible-ray marker creation work. For example, when the user creates an IR marker, the IR information recognized by the information processing system 10 can be visualized.

Further, the invisible-ray marker can give the marker function to an object without changing the appearance of the object (or design in the visible ray). For example, the marker function can be given to a commercially available product without changing the appearance of the commercially available product after the commercially available product is manufactured. Further, an object having just the same physical characteristic amount can be discriminated.

4-4. Variants

{4-4-1. Variant 1}

The third embodiment is not limited to the above examples. As a variant, the processing part 100 according to the third embodiment can perform a different processing depending on a current processing mode. For example, in a case where the current processing mode is the creation mode, the processing part 100 performs a processing of visualizing an invisible-ray marker in process of creation.

Specifically, the display part 124 can first irradiate an invisible-ray marker in process of creation with an invisible ray. At the same time, the input part 120 can sense (or capture) the marker in process of creation by use of an invisible ray. The recognition processing part 108 can then make predetermined recognition of the sensing result (such as captured image) by the invisible-ray camera. The display control part 106 can then cause the display part 124 to irradiate the marker in process of creation with a visible ray as assistance information on the basis of the recognition result.

In a case where the current processing mode is the association mode, the processing part 100 performs the visualization processing when associating the created invisible-ray marker with a predetermined function or information. For example, the processing part 100 (the display control part 106) can irradiate the created invisible-ray marker (to be associated with a predetermined function or information with an invisible ray). Additionally, in a case where sufficient visualization cannot be achieved by irradiation with an invisible ray, the processing part 100 may further sense the created invisible-ray marker by use of an invisible ray, recognize the sensing result, and cause the display part 124 to irradiate the created invisible-ray marker with a visible ray as assistance information on the basis of the recognition result.

In a case where the current processing mode is the execution mode, the processing part 100 can recognize the created invisible-ray marker, and then perform the processing depending on the recognition result. For example, the processing part 100 (the display control part 106) can cause the display part 124 to project an invisible ray on the marker for recognizing the created invisible-ray marker. Additionally, in this case, the processing part 100 does not perform the processing of visualizing the drawn contents of the invisible-ray marker. For example, the processing part 100 does not project a visible ray as assistance information depending on the recognition result of the invisible-ray marker (as described above).

{4-4-2. Variant 2}

As another variant, the marker information DB 130 according to the third embodiment may store a plurality of created invisible-ray markers. In this case, the display control part 106 may display assistance information depending on a comparison between a recognition result of the characteristic amount of a user-creating invisible-ray marker and a recognition result of the characteristic amount of each of all the other invisible-ray markers stored in the marker information DB 130 to be overlapped on the invisible-ray marker in process of creation similarly as in the second embodiment.

5. Fourth Embodiment

The third embodiment has been described below. A fourth embodiment of the present disclosure will be described below. As described below, according to the fourth embodiment, it is possible to realize a marker using hue as the characteristic amount.

The recognition processing part 108 according to the fourth embodiment performs the recognition processing including not only the geometric characteristic amount (such as the number or distribution of characteristic points) but also hue in the kinds of the characteristic amounts on a captured image of a marker in process of creation. Thereby, an illustration with the same design (shape) and different hue, such as national flag (such as tricolor flag), is also available as a marker. For example, the processing part 100 can accurately specify a country corresponding to a national flag on the basis of an image of the national flag captured by the input part 120.

Figure 21:
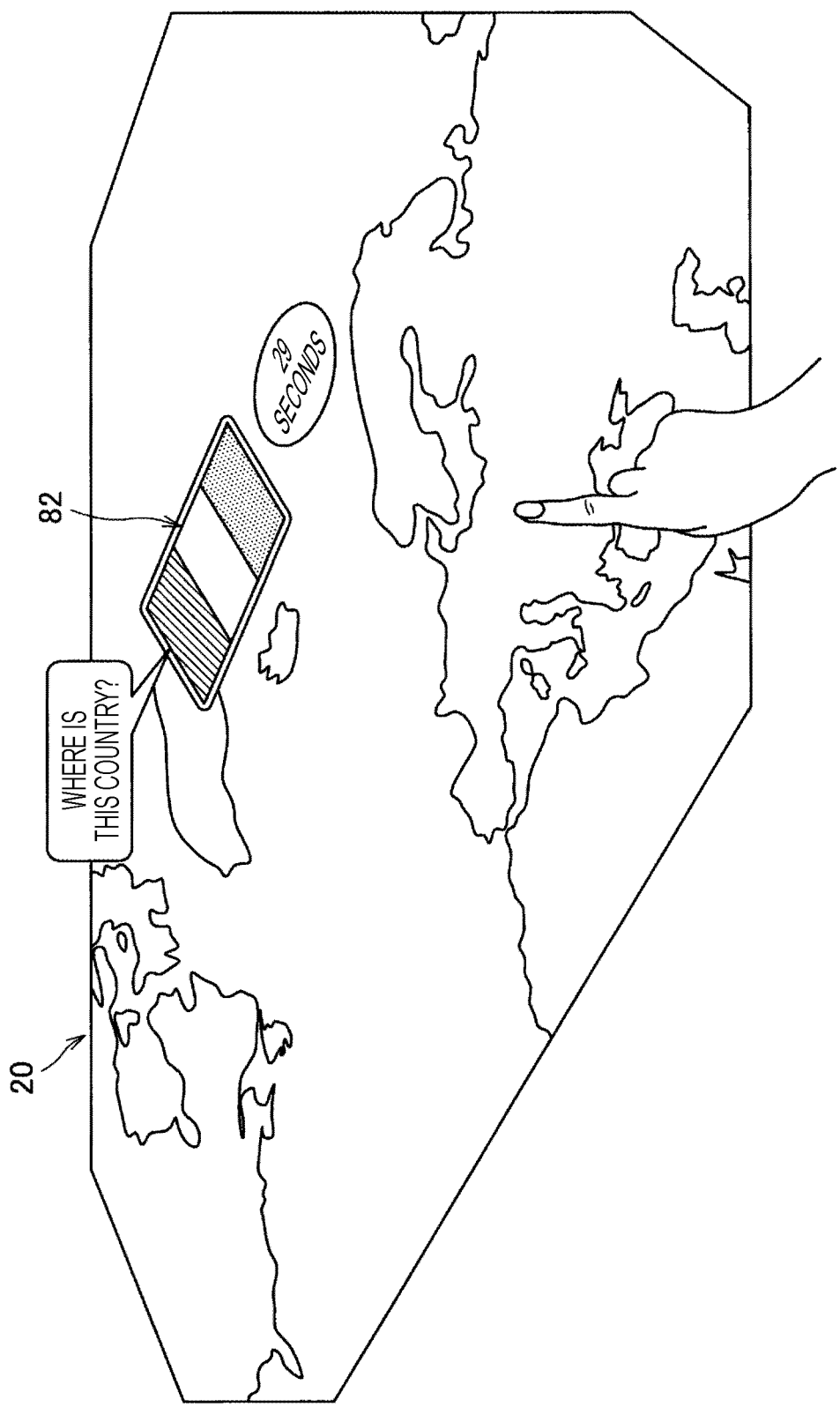
FIG. 21 is a diagram illustrating an exemplary fastest fingers first game for answering a country corresponding to a card arranged on a screen 20.

As described above, according to the fourth embodiment, it is possible to realize a marker using hue as the characteristic amount. Consequently, for example, it is possible to realize a fastest fingers first game of answering a country corresponding to a national flag card 82 arranged on the screen 20 as illustrated in FIG. 21. For example, it is assumed that a video of a world map is displayed on the screen 20 and a plurality of users surrounds the screen 20 as illustrated in FIG. 21. It is possible to realize a fastest fingers first game of answering the country corresponding to the national flag card 82 by the plurality of users when the national flag card 82 is arranged on the screen 20 in such a scene.

6. Fifth Embodiment

The fourth embodiment has been described above. A fifth embodiment of the present disclosure will be described below. As described below, it is possible to realize a language learning game using a marker object (such as card) according to the fifth embodiment.

According to the fifth embodiment, an individual marker card 84 can be previously associated with a word in a predetermined language, for example.

Figure 22A:
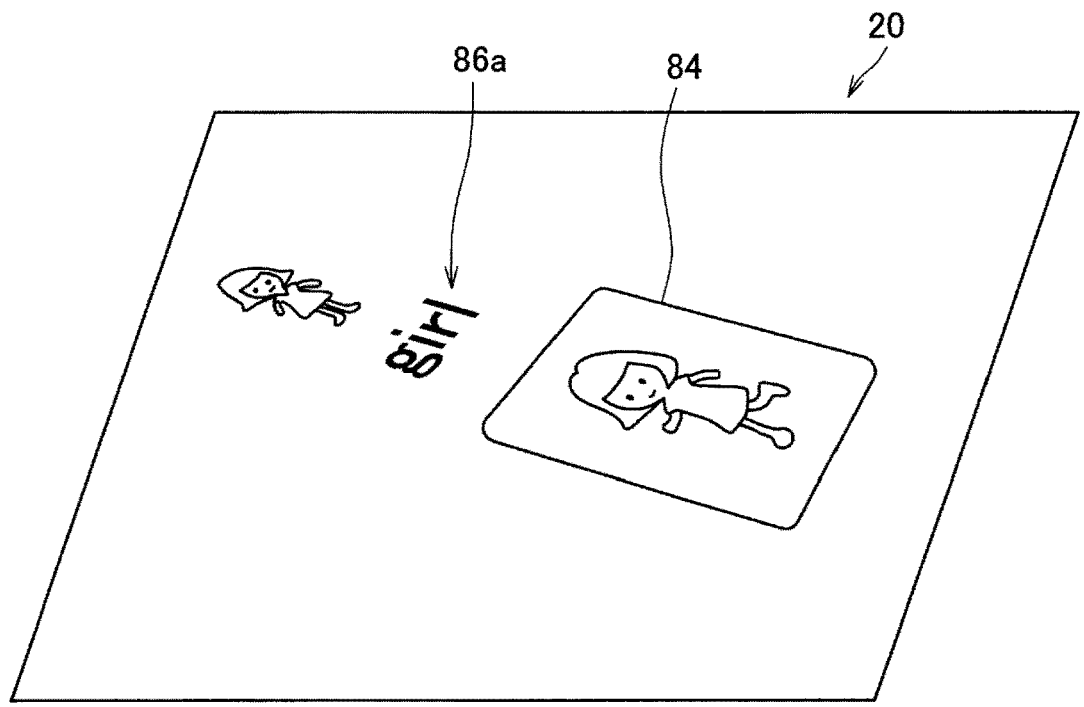
FIG. 22A is a diagram illustrating an example in which a word associated with a marker card is displayed on the screen 20 when the marker card is placed on the screen 20.

In a case where the marker card 84 is arranged on the screen 20, the recognition processing part 108 performs the predetermined recognition processing on an image of the marker card 84 captured by the input part 120. Then, the display control part 106 displays a word (and/or video associated with the word) 86*a* associated with a marker card 84*a* recognized by the recognition processing part 108 near the position where the marker card 84*a* is arranged on the screen 20 as illustrated in FIG. 22A, for example.

Figure 22B:
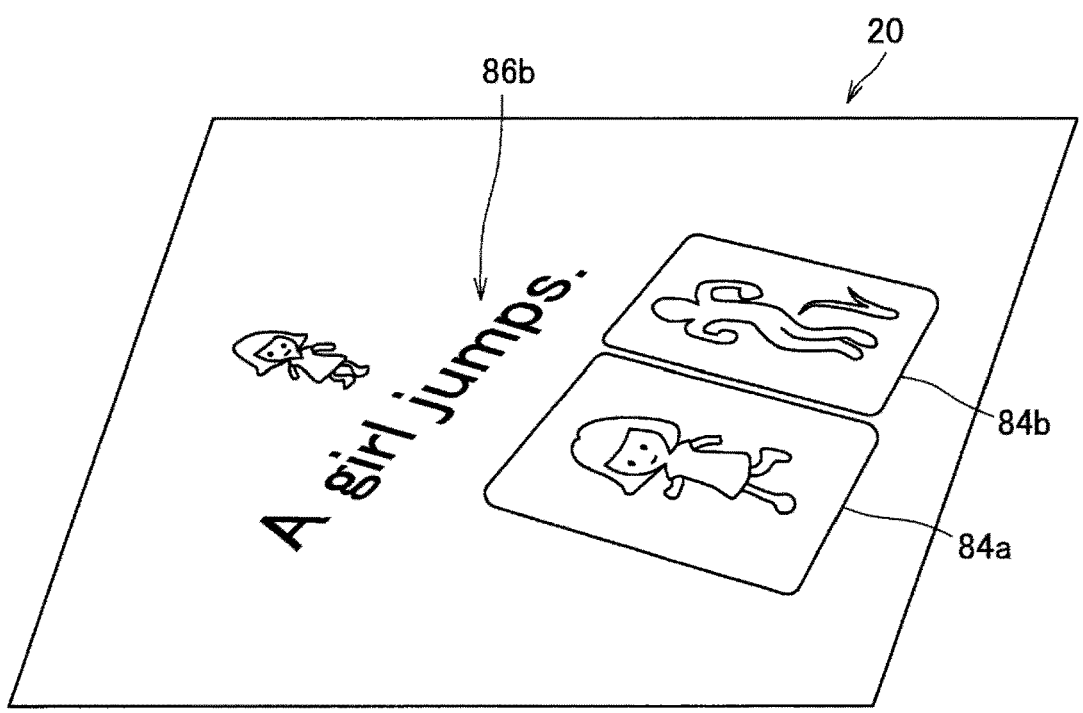
FIG. 22B is a diagram illustrating exemplary display of a video when another marker card is additionally placed on the screen 20 in the situation illustrated in FIG. 22A.

Further, in a case where a marker card 84*b* is arranged adjacent to the marker card 84*a* as illustrated in FIG. 22B, for example, the display control part 106 displays a sentence 86*b* in a combination of a word associated with the marker card 84*a* and a word associated with the marker card 84*b* near the positions where the two marker cards 84 are arranged.

As described above, according to the fifth embodiment, it is possible to realize a language learning game using a marker object. For example, a plurality of kinds of marker cards previously associated with words is arranged on the screen 20, and thus the user can interactively learn the grammar of the corresponding language.

7. Sixth Embodiment

7-1. Outline

The fifth embodiment has been described above. A sixth embodiment of the present disclosure will be described below. The sixth embodiment assumes that a marker is (not a plane texture (plane visible-ray marker or plane invisible-ray marker) described in the first embodiment to the fifth embodiment but) a 3D texture.

Figure 23A:
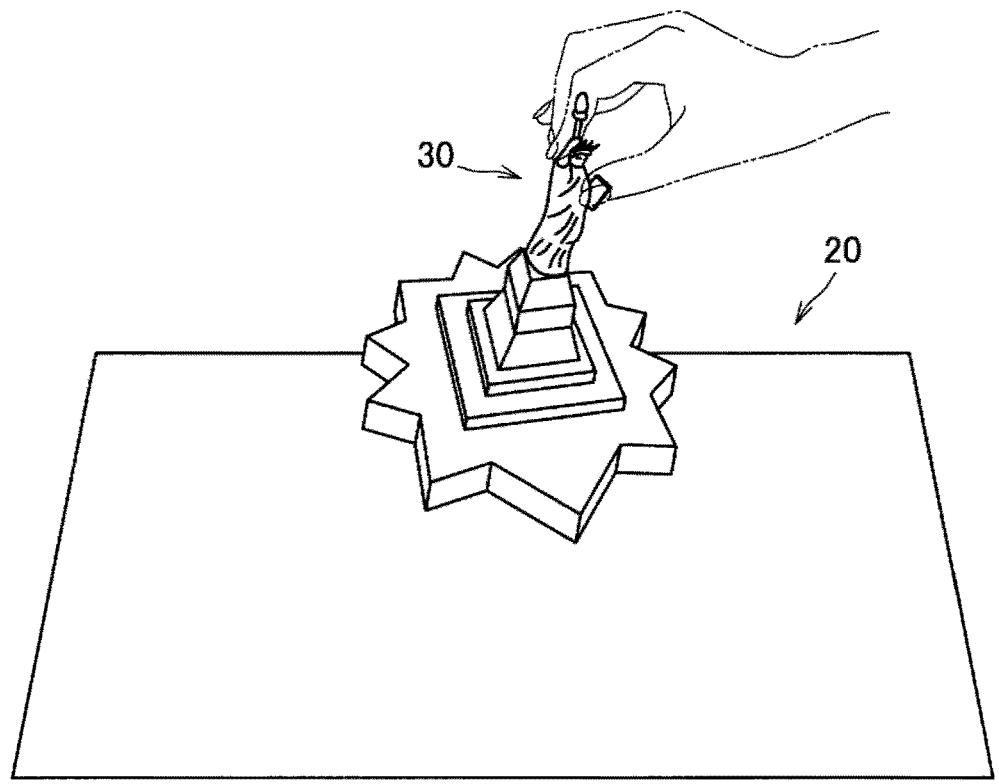
FIG. 23A is a diagram illustrating how the user arranges a 3D marker 30 on the screen 20 according to a sixth embodiment.
Figure 23B:
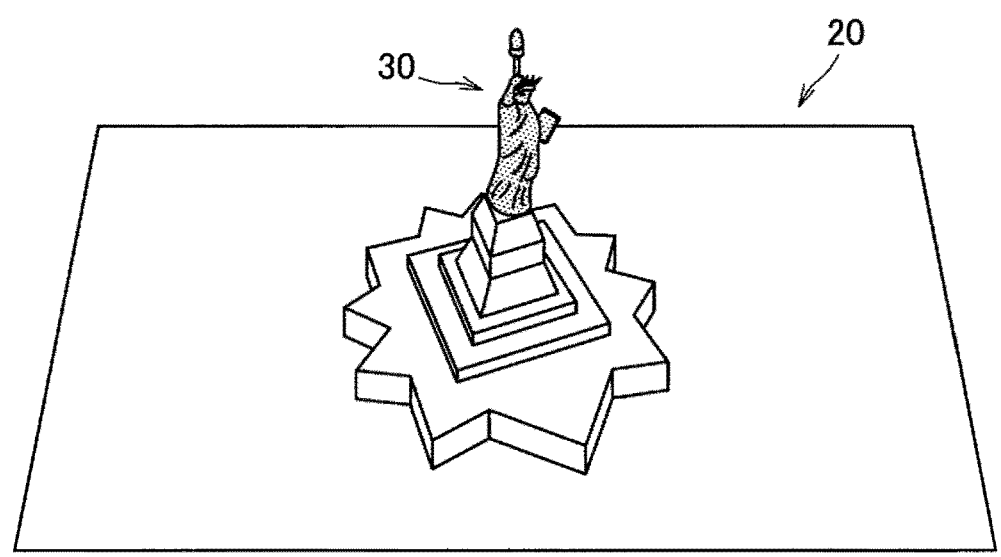
FIG. 23B is a diagram illustrating exemplary projection on the 3D marker 30 according to the sixth embodiment.

FIG. 23A illustrates that the marker is a white mock 30 of the Statue of Liberty by way of example. It is assumed that the user arranges his/her gripping mock 30 on the screen 20 as illustrated in FIG. 23A. In this case, the recognition processing part 108 can recognize a 3D shape of the mock 30. Further, as illustrated in FIG. 23B, the display control part 106 can project (projection mapping) model data onto a plurality of projection parts (such as projectors) in a plurality of different directions on the basis of the position and the posture of the mock 30 such that the color model data corresponding to the mock 30 is appropriately overlapped on the mock 30.

Incidentally, in a case where a 3D object of interest has strong symmetry, the posture of the 3D object cannot be appropriately estimated. In this case, the processing part 100 erroneously recognizes a direction in which the 3D object rotates, and can inappropriately project the model data on the 3D object.

Therefore, the sixth embodiment has been made in terms of the above circumstances. According to the sixth embodiment, it is possible to display assistance information indicating an alarm in association with a 3D object in a case where the 3D object of interest has strong symmetry.

7-2. Functional Configuration

A functional configuration of the sixth embodiment will be first described. The components included in the information processing system 10 according to the sixth embodiment can be similar to those according to the first embodiment illustrated in FIG. 5. Only the components having different functions from those in the first embodiment will be described below.

{7-2-1. Recognition Processing Part 108}

The recognition processing part 108 according to the sixth embodiment can recognize a 3D shape of a marker in process of creation on the basis of the sensing results of the 3D marker in process of creation by a plurality of input parts 120 acquired from the display processing part 122. Here, the sensing results of the 3D marker in process of creation include captured images (RGB images) of the marker in process of creation captured by a plurality of input parts 120 (stereo cameras) in the respective different directions, depth sensing results by the plurality of input parts 120 in the respective different directions, or the like.

{7-2-2. Information Acquisition Part 102}

The information acquisition part 102 according to the sixth embodiment receives or reads the recognition result of the 3D shape of the marker in process of creation by the recognition processing part 108 thereby to acquire it from the recognition processing part 108.

{7-2-3. Display Control Part 106}

The display control part 106 according to the sixth embodiment can cause the display face to display assistance information for assisting in creation of a marker on the basis of the symmetry of the 3D shape of the marker in process of creation in association with the marker. Additionally, specific processing contents will be described below.

{7-2-4. Marker Information DB 130}

FIG. 24A is a diagram illustrating an exemplary configuration of the marker information DB 130 according to the sixth embodiment. As illustrated in FIG. 24A, ID 1300, marker 1302, and characteristic points 1304 are associated in the marker information DB 130. Here, recognition data (such as shape data or captured images in a plurality of directions) for a 3D marker corresponding to a corresponding ID is stored in marker 1302. Further, information (such as image) indicating a group of characteristic points recognized from a corresponding marker is stored in characteristic points 1304.

{7-2-5. Assistance Information DB 128}

Figure 24B:
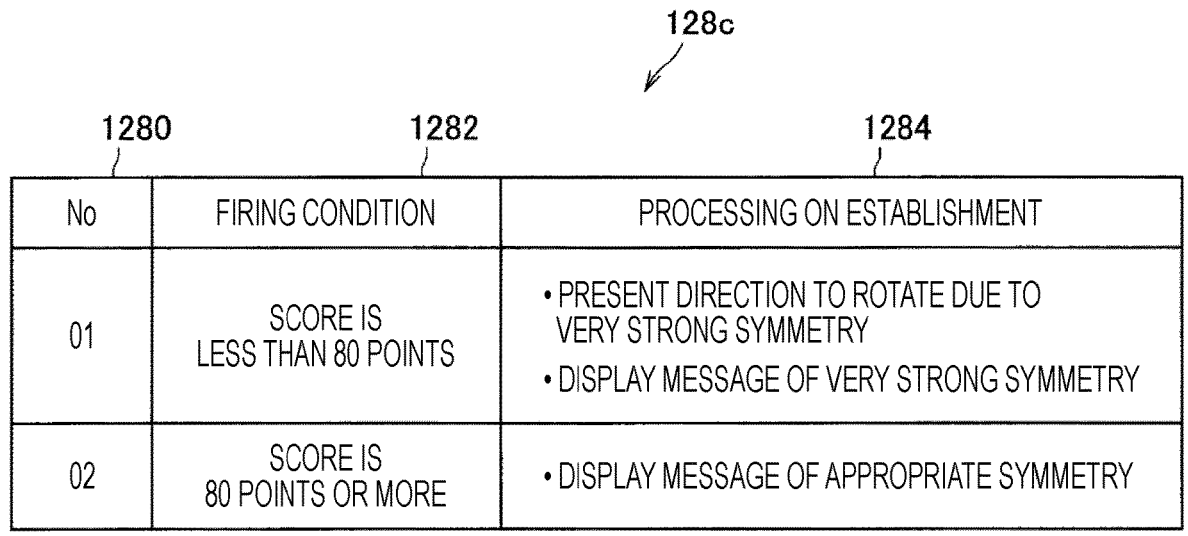
FIG. 24B is a diagram illustrating an exemplary configuration of the assistance information DB 128 according to the sixth embodiment.
Figure 24C:
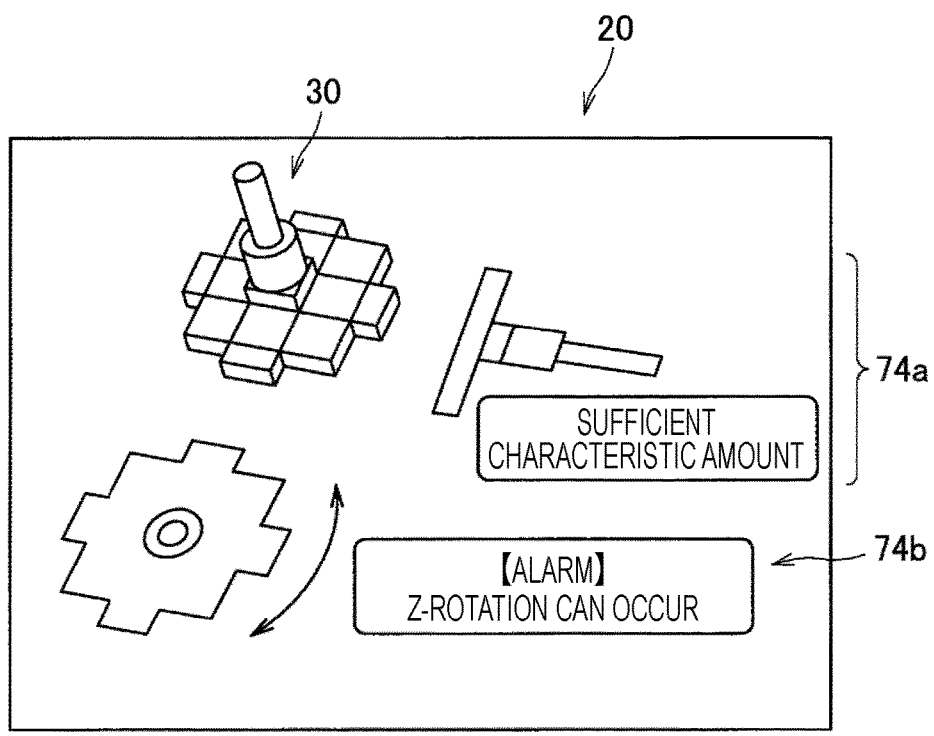
FIG. 24C is a diagram illustrating exemplary display of alarm information in a case where a calculated score is less than a predetermined threshold according to the sixth embodiment.

FIG. 24B is a diagram illustrating an exemplary configuration of the assistance information DB 128 according to the sixth embodiment. In the example illustrated in FIG. 24B, in a case where the score calculated by the score calculation part 104 is less than a predetermined threshold (such as "less than 80 points") (in other words, symmetry is very strong), the firing condition of No"01" is established. In this case, the display control part 106 performs the processing indicated by the processing setting corresponding to the firing condition registered in the assistance information DB 128. That is, the display control part 106 can display rotation direction information erroneously recognizable for the marker and alarm information 74*b* including a message of very strong symmetry in association with the marker 30 in process of creation as illustrated in FIG. 24C, for example. With the exemplary display, the user at work can be given a warning (or induction) of creation of a corresponding marker (such as mock) for appropriate symmetry, for example. Consequently, it is possible to prevent model data from being inappropriately projected on a marker when the model data corresponding to the marker is projected.

Figures 24D, 25A:
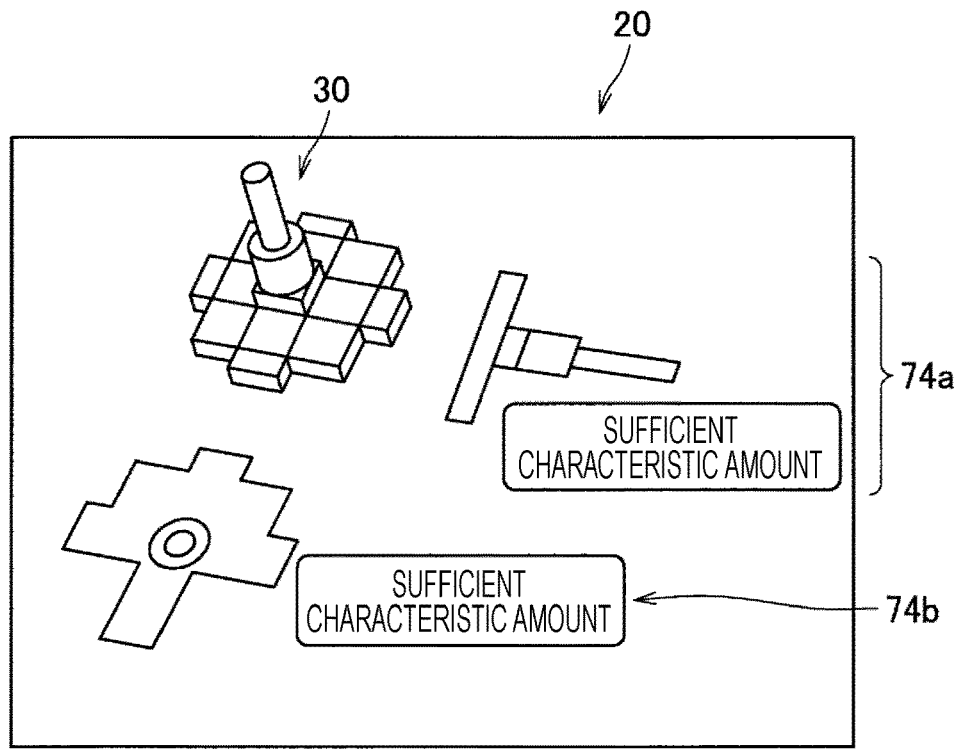
FIG. 24D is a diagram illustrating exemplary display of information indicating that symmetry is appropriate in a case where a calculated score is equal to or higher than the predetermined threshold according to the sixth embodiment.
FIG. 25A is a diagram illustrating an exemplary configuration of the assistance information DB 128 according to a seventh embodiment.

Further, in the example illustrated in FIG. 24B, in a case where the score calculated by the score calculation part 104 is the predetermined threshold or more (such as "80 points or more") (in other word, symmetry is appropriate), the firing condition of No"02" is established. In this case, the display control part 106 performs the processing indicated by the processing setting corresponding to the firing condition registered in the assistance information DB 128. That is, the display control part 106 can display the information 74 indicating that the symmetry is appropriate (the characteristic amount is sufficient, for example) in association with the marker 30 in process of creation as illustrated in FIG. 24D, for example.

(7-2-5-1. Determination of Degree of Symmetry)

Additionally, a degree of symmetry is calculated in the following method, for example. For example, the score calculation part 104 first extracts a contour from each of the captured images of the marker in process of creation captured by a plurality of input parts 120 in the respective different directions, and then calculates a degree of similarity of the contour shapes extracted from the respective captured images. Then, the score calculation part 104 may regard the calculated degree of similarity of the contour shapes as a degree of symmetry. In this case, the score calculation part 104 can calculate the score of the marker in process of creation on the basis of a preset relation equation between the degree of similarity of the contours and the score of the marker (or a table defining the relationship), and the calculated degree of similarity of the contours.

Alternatively, the score calculation part 104 may extract a contour of a marker from an image captured by the input part 120 positioned in a predetermined direction relative to the marker in process of creation (immediately above the marker, for example), and then determine a degree of symmetry on the basis of a distribution of luminance within the contour of the marker. For example, the score calculation part 104 may calculate a degree of symmetry associated with the vertical direction of the distribution of luminance within the contour of the marker and a degree of symmetry associated with the horizontal direction of the distribution of luminance, respectively, and then determine a (final) degree of symmetry on the basis of the calculation results.

Alternatively, the score calculation part 104 may first generate point group data from the sensing results of the marker in process of creation by a plurality of input parts 120, calculate a degree of symmetry of the point group data in a well-known technology, and determine a (final) degree of symmetry on the basis of the calculation result.

8. Seventh Embodiment

8-1. Background

The sixth embodiment has been described above. A seventh embodiment of the present disclosure will be described below. The background of the seventh embodiment will be first described. In a case where a relevant 3D shape is not so different from at least one of the other objects, the processing part 100 can erroneously recognize the kind of the relevant 3D object. Consequently, model data corresponding to a different kind of object can be projected onto the relevant 3D object.

As described below, according to the seventh embodiment, it is possible to assist the user to efficiently create a marker (or nonanalogous marker) different from the other registered 3D markers when creating the 3D marker.

8-2. Functional Configuration

A functional configuration of the seventh embodiment will be described below in detail. The components included in the information processing system 10 according to the seventh embodiment can be similar to those according to the sixth embodiment. Only the components having different functions from those in the sixth embodiment will be described below.

{8-2-1. Assistance Information DB 128}

FIG. 25A is a diagram illustrating an exemplary configuration of the assistance information DB 128 according to the seventh embodiment. In the example illustrated in FIG. 25A, in a case where a group of characteristic points matches with at least one of the other 3D markers stored in the marker information DB 130 as illustrated in FIG. 24A, for example, at a predetermined threshold or more (such as "80% or more"), the firing condition of No"01" is established. In this case, the display control part 106 performs the processing indicated by the processing setting corresponding to the firing condition registered in the assistance information DB 128. That is, the display control part 106 can display the information 74*b* including an image of the other 3D marker (such as mock) with a high degree of similarity of the characteristic amount and an alarm message in association with the marker 30 in process of creation as illustrated in FIG. 25B, for example. With the exemplary display, for example, the user at work can be given a warning (or induction) of creation of a marker (or nonanalogous marker) different from the other registered 3D markers. Consequently, it is possible to prevent model data corresponding to another marker from being erroneously projected onto a marker when model data corresponding to the marker is projected.

Further, in the example illustrated in FIG. 25A, in a case where a group of characteristic points matches with all the other 3D markers stored in the marker information DB 130 at less than the predetermined threshold (such as "less than 80%"), the firing condition of No"02" is established. In this case, the processing part 100 may not particularly perform the processing as illustrated in FIG. 25A.

9. Hardware Configuration

The seventh embodiment has been described above. A hardware configuration of the information processing system 10 common in the respective embodiments will be described below with reference to FIG. 26. As illustrated in FIG. 26, the information processing system 10 includes a CPU 150, a read only memory (ROM) 152, a random access memory (RAM) 154, a bus 156, an interface 158, an input apparatus 160, an output apparatus 162, a storage apparatus 164, and a communication apparatus 166.

The CPU 150 functions as a computation processing apparatus and a control apparatus, and controls the total operations in the information processing system 10 according to various programs. Further, the CPU 150 can realize the functions of the processing part 100 and the display processing part 122 in the information processing system 10.

The CPU 150 can be configured of a processor such as microprocessor.

The ROM 152 stores control data such as programs or computation parameters used by the CPU 150.

The RAM 154 temporarily stores programs and the like executed by the CPU 150, for example.

The bus 156 is configured of a CPU bus or the like. The bus 156 mutually connects the CPU 150, the ROM 152, and the RAM 154.

The interface 158 connects the input apparatus 160, the output apparatus 162, the storage apparatus 164, and the communication apparatus 166 to the bus 156.

The input apparatus 160 includes an input control circuit or the like for generating an input signal by an input device (such as touch panel, button, switch, dial, lever, or microphone) for user's inputting information or on the basis of user input, and outputting it to the CPU 150. The input apparatus 160 can realize the function of the input part 120 in the information processing system 10.

The output apparatus 162 includes a display apparatus such as projector, liquid crystal display apparatus, organic light emitting diode (OLED) apparatus, or lamp. Further, the output apparatus 162 includes a voice output apparatus such as speaker. The output apparatus 162 can realize the function of the display part 124 in the information processing system 10.

The storage apparatus 164 is a data storage apparatus. The storage apparatus 164 includes a storage medium, a recording apparatus for recording data in a storage medium, a reading apparatus for reading data from a storage medium, a delete apparatus for deleting data stored in a storage medium, or the like, for example. The storage apparatus 164 can realize the function of the storage part 126 in the information processing system 10.

The communication apparatus 166 is a communication interface configured of a communication device or the like for connecting to a communication network such as Internet or local area network (LAN). Further, the communication apparatus 166 may be a communication apparatus for wireless LAN, a communication apparatus for long term evolution (LTE), or a wired communication apparatus for wired communication. The communication apparatus 166 can realize the function of the input part 120 in the information processing system 10.

10. Variants

The preferred embodiments of the present disclosure have been described above with reference to the accompanying drawings, but the present disclosure is not limited to the examples. It is clear to those skilled in the art in the field of the technology to which the present disclosure belongs that various changes or modifications can be assumed within the scope of the technical spirit described in CLAIMS and these of course belong to the technical scope of the present disclosure.

10-1. Variant 1

The configuration of the information processing system 10 according to each embodiment is not limited to the aforementioned examples. For example, FIG. 5 illustrates that the display processing part 122 is separated from the processing part 100, but the display processing part 122 and the processing part 100 may be integrally configured, not limited to the above example.

Further, FIG. 5 illustrates that the recognition processing part 108 is included in the processing part 100 by way of example, but the recognition processing part 108 may be configured integral with the input part 120 or the display processing part 122, not limited to the above example.

10-2. Variant 2

An apparatus (information processing apparatus) including the processing part 100 according to each embodiment may include one or more of the input part 120, the display processing part 122, and the display part 124. For example, the information processing apparatus may be a projector including the processing part 100, the display processing part 122, and the display part 124.

Alternatively, the information processing apparatus may be configured integral with the table 90. Alternatively, the information processing apparatus may be connected to at least one of the input part 120, the display processing part 122, or the display part 124 via a communication network such as Internet. For example, the information processing apparatus may be a server, a general-purpose personal computer (PC), a tablet terminal, a game machine, a cell phone such as Smartphone, a portable music player, a TV receiver, a wearable device such as head mounted display (HMD), augmented reality (AR) glasses, or Smartwatch, or a robot.

10-3. Variant 3

Each step in the flow of the processing described above may not be necessarily processed in the described order. For example, each step may be processed in a changed order as needed. Further, each step may be processed partially in parallel or individually instead of being processed in time series. Further, some of the described steps may be omitted or another step may be further added.

Further, according to each embodiment described above, a computer program for causing the hardware such as the CPU 150, the ROM 152, and the RAM 154 to function similarly to each component in the information processing system 10 (particularly the processing part 100) according to each embodiment described above can be provided. Further, a storage medium recording the computer program can be provided.

Further, the effects described in the present specification are merely explanatory or exemplary, and are not restrictive. That is, the technology according to the present disclosure can obtain other effect clear to those skilled in the art from the description of the present specification together with the above effects or instead of the above effects.

Additionally, the following configurations also belong to the technical scope of the present disclosure.

(1)

An information processing system including:

an acquisition part configured to acquire a recognition result of a marker that a user is making; and a display control part configured to cause a display face to display assistance information for assisting in creation of the marker depending on the recognition result in association with the marker in process of creation.

(2)

The information processing system according to (1), in which the recognition result includes a recognition result of a characteristic amount of the marker in process of creation, and the assistance information includes an image depending on the recognition result of the characteristic amount.

(3)

The information processing system according to (2), in which the recognition result includes at least one characteristic point recognized from the marker in process of creation, the assistance information includes an image indicating each position of the at least one characteristic point, and the display control part causes the image indicating each position of the at least one characteristic point to be displayed in an overlapped manner on the marker in process of creation.

(4)

The information processing system according to (2) or (3), in which the recognition result includes at least one characteristic point recognized from the marker in process of creation, the assistance information includes an image indicating a recommended region where at least one characteristic point is recommended to add in the marker in process of creation, and the display control part causes the image indicating the recommended region to be displayed in an overlapped manner on the marker in process of creation.

(5)

The information processing system according to (4), in which the recommended region is a region where a distribution of recognized characteristic points is coarse relative to a predetermined reference in the marker in process of creation.

(6)

The information processing system according to any one of (2) to (5), in which the recognition result includes at least one characteristic point recognized from the marker in process of creation, the assistance information includes an image indicating a region where a distribution of recognized characteristic points is dense relative to a predetermined reference in the marker in process of creation, and the display control part causes the image indicating the region where the distribution of recognized characteristic points is dense relative to the predetermined reference to be displayed in an overlapped manner on the marker in process of creation.

(7)

The information processing system according to any one of (2) to (6), in which the assistance information includes information indicating a score of the marker in process of creation calculated depending on the recognition result of the characteristic amount.

(8)

The information processing system according to (7), in which as the characteristic amount recognized from the marker in process of creation is larger, a score of the marker in process of creation is calculated to be higher.

(9)

The information processing system according to any one of (2) to (8), in which contents of the assistance information are changed depending on a score of the marker in process of creation calculated depending on the recognition result.

(10)

The information processing system according to (9), in which each time a design of the marker in process of creation is changed, the changed marker is recognized, a score of the changed marker is calculated depending on a recognition result of the changed marker, and contents of the assistance information are changed depending on the score of the changed marker.

(11)

The information processing system according to any one of (2) to (10), in which the assistance information includes information indicating a comparison result between the recognition result and a recognition result of at least one of the other registered markers.

(12)

The information processing system according to (11), in which the assistance information includes information indicating whether or not a maximum value of a degree of similarity between a recognition result of the characteristic amount of the marker in process of creation and a recognition result of each characteristic amount of at least one of other markers is a predetermined threshold or more.

(13)

The information processing system according to (12), in which the assistance information further includes an image of a marker whose degree of similarity with a recognition result of the characteristic amount of the marker in process of creation is the predetermined threshold or more.

(14)

The information processing system according to any one of (1) to (13), in which the marker in process of creation is a marker for an invisible-ray, the acquisition part acquires the recognition result based on sensing of the marker in process of creation by use of the invisible ray, and the display control part causes a display part to irradiate the marker in process of creation with a visible ray as the assistance information on the basis of the recognition result.

(15)

The information processing system according to any one of (2) to (14), in which a plurality of kinds of processing modes including a first mode of assisting in creation of the marker is defined, and in a case where a current processing mode is the first mode, the display control part causes the display face to display the assistance information in association with the marker in process of creation.

(16)

The information processing system according to (15), in which the plurality of kinds of processing modes further includes a second mode of associating a marker with a predetermined function, and a third mode of executing a function associated with a marker depending on recognition of the marker.

(17)

The information processing system according to (16), in which in a case where a current processing mode is not the first mode, the display control part does not cause the display face to display the assistance information.

(18)

The information processing system according to any one of (2) to (17), further including:

a calculation part configured to calculate a score of the marker in process of creation depending on the recognition result.

(19)

The information processing system according to any one of (1) to (18), in which the acquisition part acquires a 3D shape of the marker as a recognition result of the marker.

(20)

The information processing system according to (19), in which the display control part causes the display face to display the assistance information on the basis of symmetry of a 3D shape of the marker.

(21)

An information processing method including:

acquiring a recognition result of a marker that a user is making; and causing, by a processor, a display face to display assistance information for assisting in creation of the marker depending on the recognition result in association with the marker in process of creation.

(22)

A program for causing a computer to function as:

an acquisition part configured to acquire a recognition result of a marker that a user is making; and a display control part configured to cause a display face to display assistance information for assisting in creation of the marker depending on the recognition result in association with the marker in process of creation.

REFERENCE SIGNS LIST

10 Information processing system
30 Marker
100 Processing part
102 Information acquisition part
104 Score calculation part
106 Display control part
108 Recognition processing part
120 Input part
122 Display processing part
124 Display part
126 Storage part
128 Assistance information DB
130 Marker information DB

The invention claimed is:

1. An information processing system comprising:
circuitry configured to
acquire a recognition result of a marker that a user is making; and
cause a display face to display assistance information for assisting in creation of the marker depending on the recognition result in association with the marker in process of creation, wherein
the recognition result includes a recognition result of a characteristic amount of the marker in process of creation,
the recognition result includes at least one characteristic point recognized from the marker in process of creation,
the assistance information includes an image displayed on a recommended region of the marker indicating a location in the marker in which at least one characteristic point is recommended to add at the location in the marker in process of creation,
the recommended region of the marker includes a portion of the marker,
in a case where symmetry of a 3D shape of the marker with respect to an axis of the marker is greater than a predetermined threshold, the circuitry is further configured to cause the display face to display an alarm indicating that rotation about the axis can occur.

2. The information processing system according to claim 1,
wherein the assistance information includes an image depending on the recognition result of the characteristic amount.

3. The information processing system according to claim 2,
wherein the recognition result includes at least one characteristic point recognized from the marker in process of creation,
the assistance information includes an image indicating each position of the at least one characteristic point, and
the circuitry is further configured to cause the image indicating each position of the at least one characteristic point to be displayed in an overlapped manner on the marker in process of creation.

4. The information processing system according to claim 2,
wherein the circuitry is further configured to cause the image indicating the recommended region to be displayed in an overlapped manner on the marker in process of creation.

5. The information processing system according to claim 4,
wherein the recommended region is a region where a distribution of recognized characteristic points is coarse relative to a predetermined reference in the marker in process of creation.

6. The information processing system according to claim 2,
wherein the recognition result includes at least one characteristic point recognized from the marker in process of creation,
the assistance information includes an image indicating a region where a distribution of recognized characteristic points is dense relative to a predetermined reference in the marker in process of creation, and
the circuitry is further configured to cause the image indicating the region where the distribution of recognized characteristic points is dense relative to the predetermined reference to be displayed in an overlapped manner on the marker in process of creation.

7. The information processing system according to claim 2,
wherein the assistance information includes information indicating a score of the marker in process of creation calculated depending on the recognition result of the characteristic amount.

8. The information processing system according to claim 7,
wherein as the characteristic amount recognized from the marker in process of creation is larger, a score of the marker in process of creation is calculated to be higher.

9. The information processing system according to claim 2,
wherein contents of the assistance information are changed depending on a score of the marker in process of creation calculated depending on the recognition result.

10. The information processing system according to claim 9,
wherein each time a design of the marker in process of creation is changed, the changed marker is recognized,
a score of the changed marker is calculated depending on a recognition result of the changed marker, and
contents of the assistance information are changed depending on the score of the changed marker.

11. The information processing system according to claim 2,
wherein the assistance information includes information indicating a comparison result between the recognition result and a recognition result of at least one of other registered markers.

12. The information processing system according to claim 11,
wherein the assistance information includes information indicating whether or not a maximum value of a degree of similarity between a recognition result of the characteristic amount of the marker in process of creation and a recognition result of each characteristic amount of at least one of other markers is a predetermined threshold or more.

13. The information processing system according to claim 12,
wherein the assistance information further includes an image of a marker whose degree of similarity with a recognition result of the characteristic amount of the marker in process of creation is the predetermined threshold or more.

14. The information processing system according to claim 2,
wherein a plurality of kinds of processing modes including a first mode of assisting in creation of the marker is defined, and
in a case where a current processing mode is the first mode, the circuitry is further configured to cause the display face to display the assistance information in association with the marker in process of creation.

15. The information processing system according to claim 14,
wherein the plurality of kinds of processing modes further includes a second mode of associating a marker with a predetermined function, and a third mode of executing a function associated with a marker depending on recognition of the marker.

16. The information processing system according to claim 15,
wherein in a case where a current processing mode is not the first mode, the circuitry is further configured to not cause the display face to display the assistance information.

17. The information processing system according to claim 2,
wherein the circuitry is further configured to calculate a score of the marker in process of creation depending on the recognition result.

18. The information processing system according to claim 1,
wherein the marker in process of creation is a marker for an invisible ray,
the circuitry is further configured to acquire the recognition result based on sensing of the marker in process of creation by use of the invisible ray, and
the circuitry is further configured to cause a display part to irradiate the marker in process of creation with a visible ray as the assistance information on a basis of the recognition result.

19. The information processing system according to claim 1,
wherein the circuitry is further configured to acquire a 3D shape of the marker as a recognition result of the marker.

20. The information processing system according to claim 19,
wherein the circuitry is further configured to cause the display face to display the assistance information on a basis of symmetry of a 3D shape of the marker.

21. The information processing system according to claim 1,
wherein the recommended region of the marker does not include any characteristic points.

22. An information processing method comprising:
acquiring a recognition result of a marker that a user is making;
causing, by a processor, a display face to display assistance information for assisting in creation of the marker depending on the recognition result in association with the marker in process of creation, wherein
the recognition result includes a recognition result of a characteristic amount of the marker in process of creation,
the recognition result includes at least one characteristic point recognized from the marker in process of creation,
the assistance information includes an image displayed on a recommended region of the marker indicating a location in the marker in which at least one characteristic point is recommended to add at the location in the marker in process of creation, and
the recommended region of the marker includes a portion of the marker; and
causing, by the processor and in a case where symmetry of a 3D shape of the marker with respect to an axis of the marker is greater than a predetermined threshold, causing, the display face to display an alarm indicating that rotation about the axis can occur.

23. A non-transitory computer-readable medium having embodied thereon a program, which when executed by a computer causes the computer to execute an information processing method, the method comprising:
acquiring a recognition result of a marker that a user is making;
causing a display face to display assistance information for assisting in creation of the marker depending on the recognition result in association with the marker in process of creation, wherein
the recognition result includes a recognition result of a characteristic amount of the marker in process of creation,
the recognition result includes at least one characteristic point recognized from the marker in process of creation,
the assistance information includes an image displayed on a recommended region of the marker indicating a location in the marker in which at least one characteristic point is recommended to add at the location in the marker in process of creation, and
the recommended region of the marker includes a portion of the marker; and
causing, in a case where symmetry of a 3D shape of the marker with respect to an axis of the marker is greater than a predetermined threshold, the display face to display an alarm indicating that rotation about the axis can occur.

* * * * *